(12) United States Patent
Nishino et al.

(10) Patent No.: US 8,488,413 B2
(45) Date of Patent: Jul. 16, 2013

(54) INDICATED POSITION DETECTING APPARATUS AND INDICATED POSITION DETECTING METHOD

(75) Inventors: Toshiharu Nishino, Hamura (JP); Tetsushi Yoshida, Tsukui-gun (JP); Kunpei Kobayashi, Tachikawa (JP); Makoto Iwasaki, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 12/902,333

(22) Filed: Oct. 12, 2010

(65) Prior Publication Data

US 2011/0090761 A1 Apr. 21, 2011

(30) Foreign Application Priority Data

Oct. 16, 2009 (JP) ................... 2009-238796
Nov. 6, 2009 (JP) ................... 2009-254511
Mar. 10, 2010 (JP) ................... 2010-052456

(51) Int. Cl.
*G06F 3/041* (2006.01)

(52) U.S. Cl.
USPC ........................................ 367/127

(58) Field of Classification Search
USPC ........................ 367/127; 178/18.01
See application file for complete search history.

(56) References Cited

U.S. PATENT DOCUMENTS

| | | | |
|---|---|---|---|
| 3,504,334 A * | 3/1970 | Turnage, Jr. | 367/127 |
| 4,995,011 A | 2/1991 | Spiesberger | |
| 5,072,427 A * | 12/1991 | Knowles | 367/118 |
| 5,691,959 A | 11/1997 | Kriewall et al. | |
| 6,922,642 B2 | 7/2005 | Sullivan | |
| 7,088,347 B2 | 8/2006 | Iisaka et al. | |
| 8,274,480 B2 | 9/2012 | Sullivan | |
| 2006/0132464 A1 | 6/2006 | Sullivan | |
| 2008/0128178 A1* | 6/2008 | Jia | 178/18.01 |
| 2009/0207131 A1 | 8/2009 | Togami et al. | |
| 2010/0195445 A1* | 8/2010 | Calhoun | 367/127 |
| 2011/0090761 A1* | 4/2011 | Nishino et al. | 367/127 |

FOREIGN PATENT DOCUMENTS

| | | |
|---|---|---|
| CN | 1739090 A | 2/2006 |
| CN | 201242738 Y | 5/2009 |
| CN | 101515197 A | 8/2009 |
| JP | 4-038510 A | 2/1992 |
| JP | 5-040570 A | 2/1993 |

(Continued)

OTHER PUBLICATIONS

Japanese Office Action dated Sep. 27, 2011 (and English translation thereof) in counterpart Japanese Application No. 2009-254511.

(Continued)

*Primary Examiner* — Daniel Pihulic
(74) *Attorney, Agent, or Firm* — Holtz, Holtz, Goodman & Chick, PC

(57) ABSTRACT

An indicated position detecting apparatus includes a display module having a display screen, and a plurality of microphones to detect a contact sound to the display screen. The plurality of microphones are arranged at an outer peripheral portion of the display screen to be apart from each other. A time difference acquisition unit acquires arrival time differences of the contact sound between two microphones in each of two combinations of the plurality of microphones. A positional information acquisition unit derives two hyperbolas corresponding to the arrival time differences acquired by the time difference acquisition unit, each hyperbola having focal points at the two microphones in each of the two combinations of the plurality of microphones, and acquires an intersection of the two derived hyperbolas as information of a position where the contact sound is generated.

18 Claims, 23 Drawing Sheets

FOREIGN PATENT DOCUMENTS

| | | |
|---|---|---|
| JP | 07-244147 A | 9/1995 |
| JP | 8-006703 A | 1/1996 |
| JP | 09-146685 A | 6/1997 |
| JP | 09-305306 A | 11/1997 |
| JP | 2001-125736 A | 5/2001 |
| JP | 2002-351605 A | 12/2002 |
| JP | 2009-48653 A | 3/2009 |
| KR | 2002-0075283 A | 10/2002 |
| KR | 2005-0088103 A | 9/2005 |

OTHER PUBLICATIONS

Japanese Office Action dated Sep. 27, 2011 (and English translation thereof) in counterpart Japanese Application No. 2010-052456.
Chinese Office Action dated Nov. 9, 2012 (and English translation thereof) in counterpart Chinese Application No. 201010511717.4.
Korean Office Action dated May 25, 2012 (and English translation thereof) in counterpart Korean Application No. 10-2010-0100158.

* cited by examiner

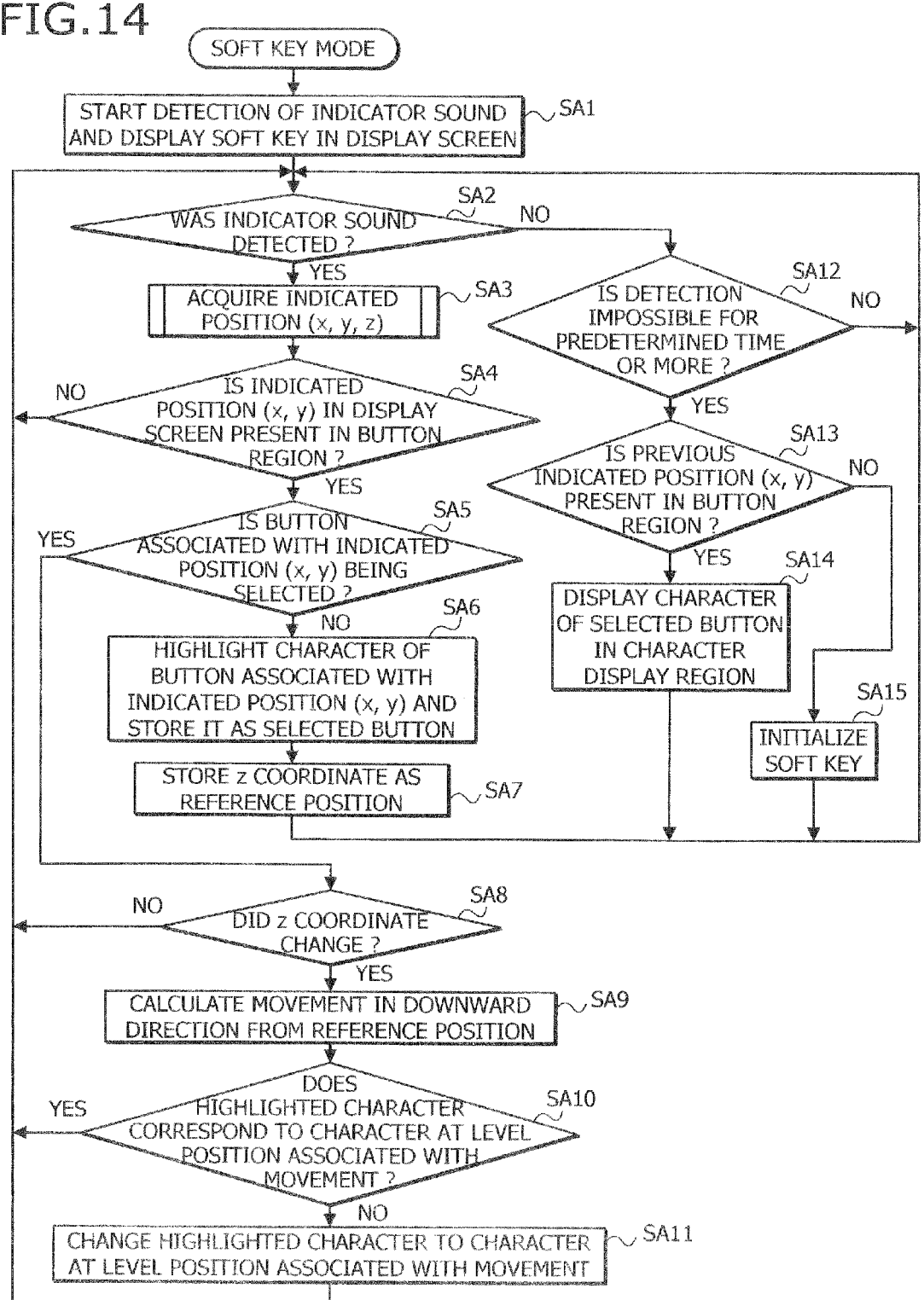

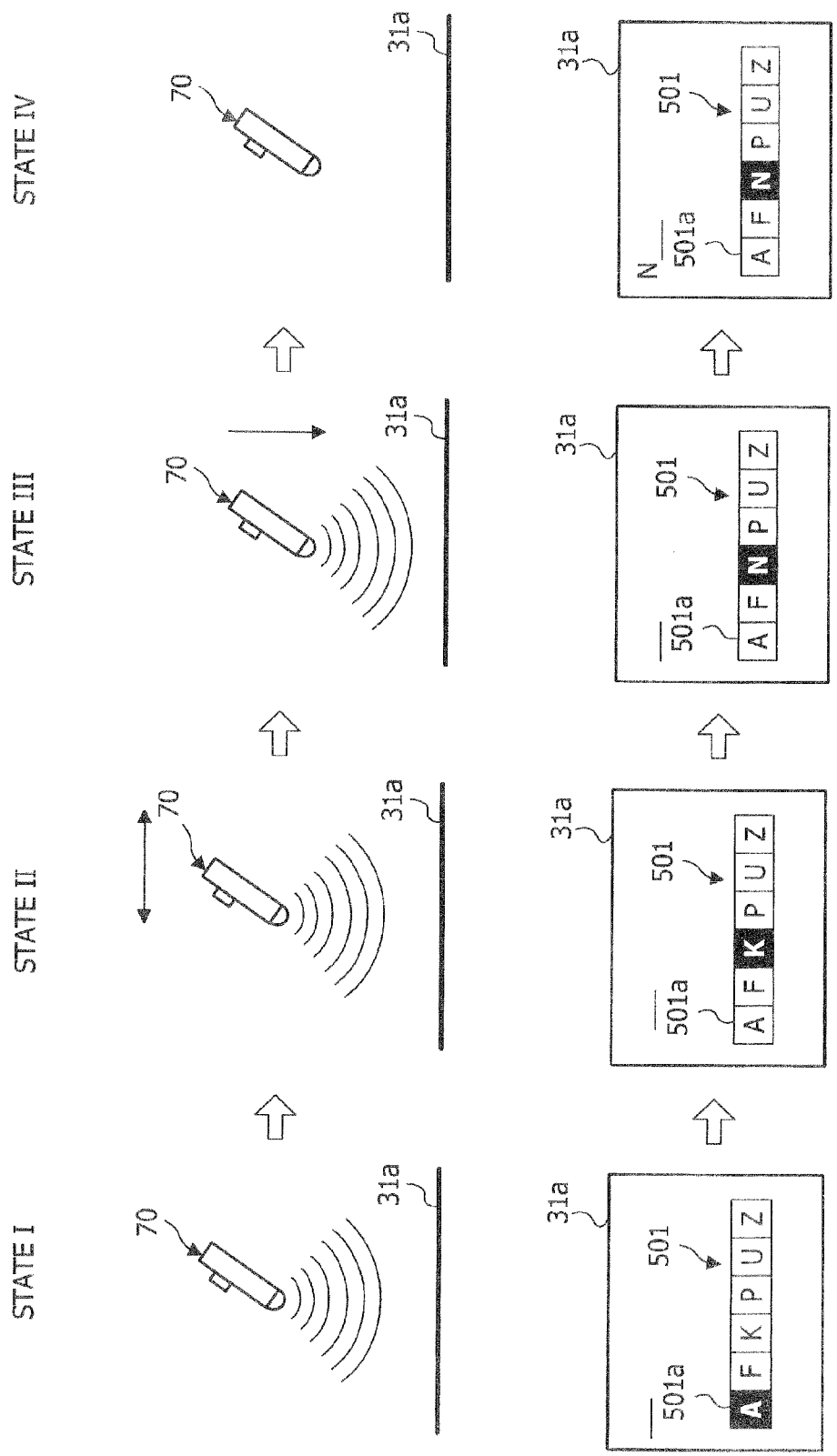

INDICATED POSITION DETECTING APPARATUS AND INDICATED POSITION DETECTING METHOD

CROSS-REFERENCE TO RELATED APPLICATIONS

This application is based upon and claims the benefit of priority from prior Japanese Patent Applications No. 2009-238796, filed on Oct. 16, 2009; No. 2009-254511, filed on Nov. 6, 2009; and No. 2010-052456, filed on Mar. 10, 2010, the entire contents of all of which are incorporated herein by reference.

BACKGROUND OF THE INVENTION

1. Field of the Invention

The present invention relates to a technology for detecting a indicated position with respect to a display screen.

2. Description of the Related Art

As an apparatus which is provided in a display apparatus such as an LCM (a Liquid Crystal panel Module) or a CRT (a cathode-ray tube) and configured to indicate an arbitrary position in a display screen of the display apparatus, a resistive touch panel has been conventionally known. The resistive touch panel has a configuration that a film is attached to a front glass surface serving as a base to sandwich a spacer therebetween and a transparent electrode grating called an ITO (an Indium Tin Oxide) is provided on each of surfaces of both the glass and the film that face each other. In this touch panel, when the film-side surface is pressed by a pen or a finger, the ITO is energized at a location corresponding to this position, and hence measuring a voltage corresponding to resistance associated with the indicated position enables detecting the indicated position (e.g., JP-A 2009-48653 (KO-KAI)).

In the resistive touch panel, the display screen of the display apparatus must be covered with a film having an electrode grating provided thereon. This often deteriorates display characteristics of an LCM and the like.

BRIEF SUMMARY OF THE INVENTION

An indicated position detecting apparatus according to an aspect of the invention comprises a display module having a display screen; a plurality of microphones which are arranged at an outer peripheral portion of the display screen to be apart from each other and detect a contact sound to the display screen; a time difference acquisition unit which acquires arrival time differences of the contact sound between two microphones in each of two combinations of the plurality of microphones; and a positional information acquisition unit which derives two hyperbolas corresponding to the arrival time differences acquired by the time difference acquisition unit, each hyperbola having focal points at the two microphones in each of the two combinations of the plurality of microphones, and acquires an intersection of the two derived hyperbolas as information of a position where the contact sound is generated.

An indicated position detecting apparatus according to another aspect of the invention comprises a display module having a display screen; a plurality of microphones which are arranged at an outer peripheral portion of the display screen to be apart from each other and detect indicator sound emitted from a three-dimensional space above the display screen; a time difference acquisition unit which acquires arrival time differences of the contact sound between two microphones in each of three combinations of the plurality of microphones; and a positional information acquisition unit which derives three hyperboloids corresponding to the arrival time differences acquired by the time difference acquisition unit, each hyperboloid having focal points at the two microphones in each of the three combinations of the plurality of microphones, and acquires an intersection of the three derived hyperboloids as information of a position where the indicator sound is emitted.

An indicated position detecting method according to an aspect of the invention comprises a time difference acquisition step of acquiring arrival time differences of contact sound between two microphones in each of two combinations of a plurality of microphones which are arranged at an outer peripheral portion of a display screen in a display module to be apart from each other in order to detect the contact sound to the display screen; and a positional information acquisition step of deriving two hyperbolas corresponding to the arrival time differences acquired by the time difference acquisition step, each hyperbola having focal points at the two microphones in each of the two combinations of the plurality of microphones, and acquiring an intersection of the two derived hyperbolas as information of a position where the contact sound is generated.

An indicated position detecting method according to another aspect of the invention comprises a time difference acquisition step of acquiring arrival time differences of contact sound between two microphones in each of four combinations of four microphones which are arranged at an outer peripheral portion of a display screen in a display module to be apart from each other in order to detect the contact sound to the display screen; and a positional information acquisition step of deriving hyperbolas corresponding to the arrival time differences acquired by the time difference acquisition step, each hyperbola having focal points at the two microphones in each of the four combinations of the four microphones, and acquiring information of a position where the contact sound is generated based on the derived hyperbolas.

An indicated position detecting method according to another aspect of the invention comprises a time difference acquisition step of acquiring arrival time differences of indicator sound between two microphones in each of three combinations of a plurality of microphones which are arranged at an outer peripheral portion of a display screen in a display module to be apart from each other in order to detect the indicator sound emitted from a three-dimensional space above the display screen; and a positional information acquisition step of deriving three hyperboloids corresponding to the arrival time differences acquired by the time difference acquisition step, each hyperboloid having focal points at the two microphones in each of the three combinations of the plurality of microphones, and acquiring an intersection of the three derived hyperboloids as information of a position where the indicator sound is emitted.

An indicated position detecting method according to another aspect of the invention comprises a time difference acquisition step of acquiring arrival time differences of indicator sound between two microphones in each of four combinations of four microphones which are arranged at an outer peripheral portion of a display screen in a display module to be apart from each other in order to detect the indicator sound emitted from a three-dimensional space above the display screen; and a positional information acquisition step of deriving hyperboloids corresponding to the arrival time differences acquired by the time difference acquisition step, each hyperboloid having focal points at the two microphones in each of the four combinations of the four microphones, and acquiring information of a position where the indicator sound is emitted based on the derived hyperboloids.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 14 is a flowchart showing processing contents in a soft key mode;

FIG. 16 is an explanatory view showing an example of an operation of the personal digital assistant in the soft key mode;

DETAILED DESCRIPTION OF THE INVENTION

First Embodiment

Figure 1:
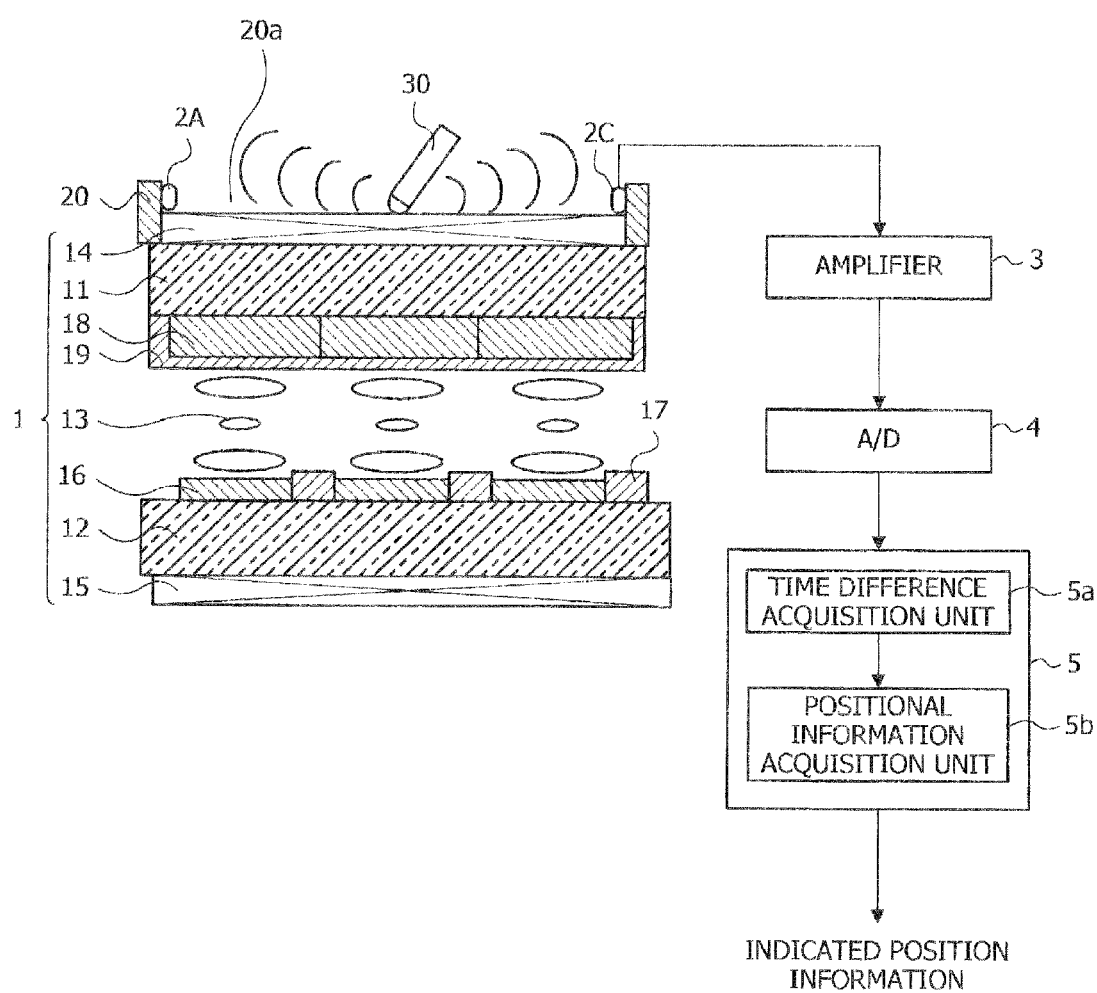
FIG. 1 is a structural view showing an indicated position detecting apparatus according to a first embodiment.

Embodiments according to the present invention will now be described hereinafter. FIG. 1 is a structural view showing a first embodiment of an indicated position detecting apparatus according to the present invention.

An indicated position detecting apparatus according to this embodiment detects an arbitrary indicated position in a display screen of an LCM 1 that displays characters or images. That is, it detects an indicated position in a two-dimensional plane on the display screen as the indicated position. Further, the indicated position detecting apparatus is formed of the LCM 1, four microphones 2A, 2B, 2C, and 2D (see FIG. 2A and FIG. 2B) provided on a display screen side of the LCM 1, an amplifier 3, an A/D converter 4, and a position acquisition unit 5.

The LCM 1 depicted in FIG. 1 is of a transmission type, and it has two transparent glass substrates 11 and 12 on a front surface side and a back surface side, a liquid crystal 13 interposed between the two glass plates 11 and 12, and polarizing plates 14 and 15 attached to outer surfaces of the glass substrates 11 and 12, respectively.

A pattern of a transparent pixel electrode 16 is formed on an inner surface of the glass substrate 12 on the back surface side, and TFTs (Thin Film Transistors) 17 are formed at portions associated with pixels in the pixel electrode 16. Patterns of color filters 18 having a predetermined color arrangement and a transparent common electrode 19 are formed as layers on an inner surface of the glass substrate 11 on the front surface side.

A periphery of the polarizing plate 14 on the front surface side is covered with a frame cover 20 having a display window 20a opened therein. In the following description, a region in a display surface (a surface of the polarizing plate 14 on the front surface side) of the LCM 1 that can be seen from the display window 20a is called a display screen 1a of the LCM 1. It is to be noted that, when using the LCM 1, a surface light source formed of a light guide plate or a backlight is provided on a back surface of the polarizing plate 15 on the back surface side. Furthermore, a transparent protective cover is provided to the display window 20a as required. Moreover, the display screen 1a is formed into a rectangular shape.

Figure 2A:
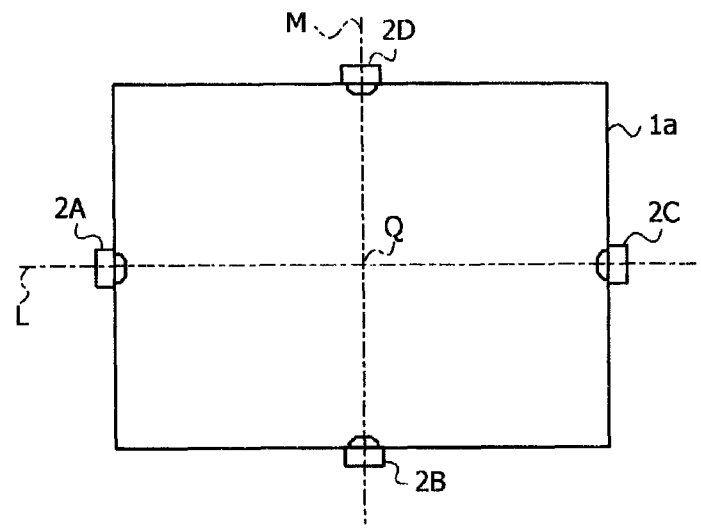
FIG. 2A is an arrangement plan of each microphone in the first embodiment.

On the other hand, the four microphones 2A, 2B, 2C, and 2D constituting the indicated position detecting apparatus are arranged on the inner side of the display window 20a. FIG. 2A is an arrangement plan of the respective microphones 2A, 2B, 2C, and 2D with respect to the display screen 1a of the LCM 1. It is to be noted that the microphones 2A, 2B, 2C, and 2D will be referred to as first, second, third, and fourth microphones in the following description, respectively, to discriminate them from each other.

As shown in FIG. 2A, the first to fourth microphones 2A to 2D are arranged on respective sides of the display screen 1a so as to be placed at an outer peripheral portion of the display screen 1a. Giving a specific description, the first to fourth microphones 2A to 2D are orthogonal to each other at a center Q of the rectangular display screen 1a, and they are arranged to form respective pairs on two straight lines L and M that are present on a plane parallel to the display screen 1a, i.e., the same plane facing the display screen 1a. That is, the first and third microphones 2A and 2C are arranged to form a pair on one straight line L parallel to wide sides of the display screen 1a, and the second and fourth microphones 2B and 2D are arranged to form a pair on the other straight line M parallel to narrow sides of the display screen 1a.

Figure 2B:
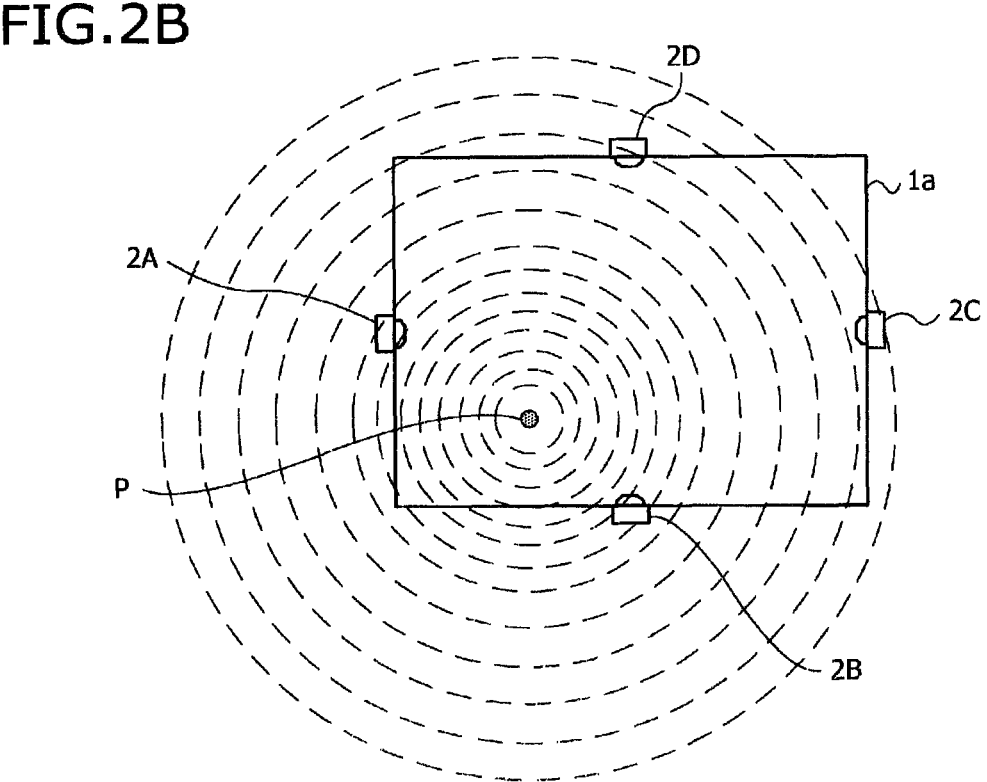
FIG. 2B is an arrangement plan of each microphone in the first embodiment.

Furthermore, the first to fourth microphones 2A to 2D individually detect at different positions indicator sound produced at an arbitrary indicated position P in the display screen 1a exemplified in FIG. 2B and output the detected sound as analog acoustic signals to an amplifier 3, respectively.

The indicator sound detected by the first to fourth microphones 2A to 2D is, e.g., indicator sound generated by a predetermined stylus pen 30 shown in FIG. 1 or sound produced on the surface of the display screen 1a when, e.g., an end of an arbitrary pen type indicator or a fingertip comes into contact. That is, the indicator sound detected by the first to fourth microphones 2A to 2D is a contact sound generated on or near the display screen 1a when an indicator indicates an arbitrary position on the display screen 1a.

It is to be noted that the stylus pen 30 includes, e.g., a sensor or a switch that detects contact with the display screen 1a and a sound discharge unit such as a small speaker or a buzzer that is provided on the end portion side which comes into contact with the display screen 1a and generates cyclic tone as the contact sound when it is detected that the end portion has come into contact with the display screen 1a.

The amplifier 3 amplifies the analog acoustic signals output from first to fourth microphones 2A to 2D, and the A/D converter 4 converts the acoustic signals amplified by the amplifier 3 into digital signals.

The position acquisition unit 5 is constituted of a microcomputer which includes, e.g., a CPU (a Central Processing Unit), a peripheral circuit such as an input/output interface, a memory storing a predetermined program, and a work memory, and it also function as a time difference acquisition unit 5a and a positional information acquisition unit 5b according to the present invention. Moreover, the position acquisition unit 5 acquires based on a later-described procedure using a hyperbolic method indicated position information indicative of a generation source of the indicator sound detected by the first to fourth microphones 2A to 2D from output signals (the acoustic signals) of the first to fourth microphones 2A to 2D which have been converted into the digital signals by the A/D converter 4 and supplies the acquired indicated position information to any other apparatus.

Figure 3:
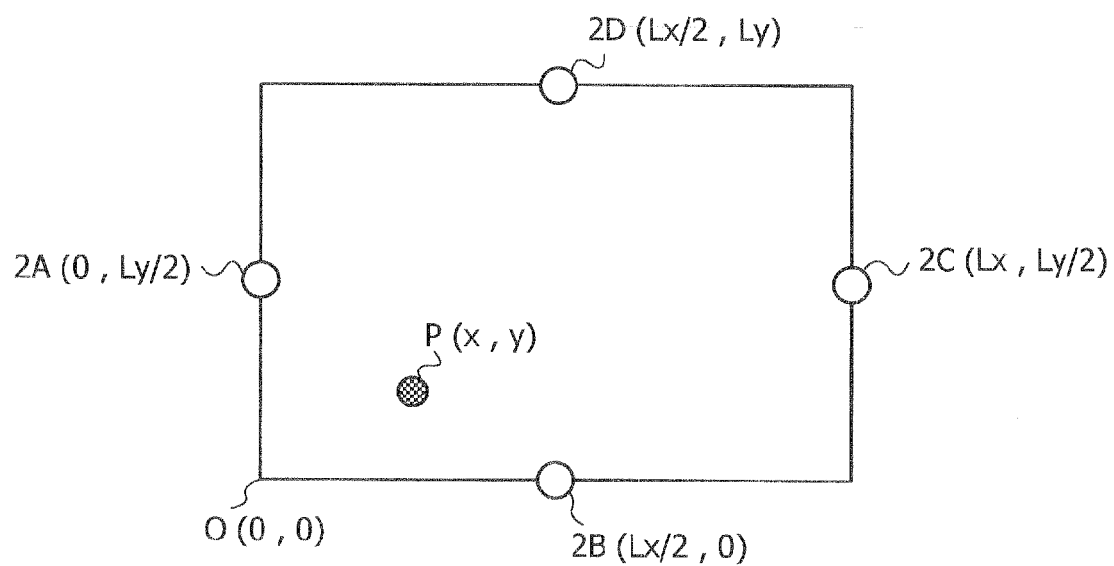
FIG. 3 is a view showing a coordinate position of each microphone in the first embodiment.

As shown in FIG. 3, the indicated position information acquired by the position acquisition unit 5 is a coordinate position (x, y) of an XY coordinate system in which a specific corner (a lower left corner in FIG. 3) of the display screen 1a is determined as an origin O (0, 0). It is to be noted that a target to which the position acquisition unit 5 supplies the indicated position information is arbitrary and it is, e.g., a personal computer which controls information (characters or images) displayed by the LCM 1.

A procedure of acquiring a coordinate position (x, y) in the position acquisition unit 5 will now be described. The position acquisition unit 5 cyclically acquires a change in sound pressure level in each of output signals of the first to fourth microphones 2A to 2D (it may steadily acquire the same).

Figure 4A:
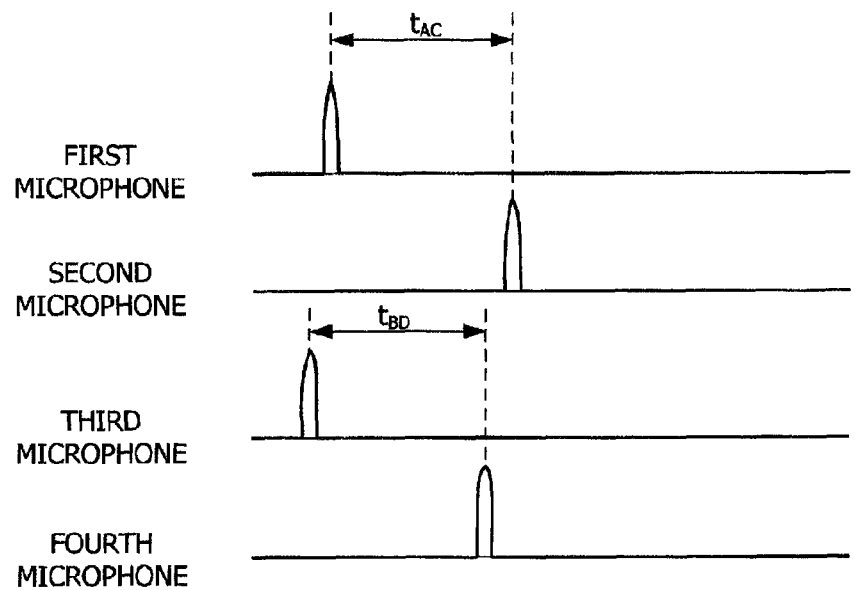
FIG. 4A is an explanatory view showing an acquisition method for an indicated position in the first embodiment.

FIG. 4A is a view showing a change in sound pressure level in each of the output signals of the first to fourth microphones 2A to 2D when the indicator sound is detected for the sake of simplicity, and an abscissa represents a time whilst an ordinates represents a sound pressure level. Further, the sound pressure level is a sound pressure level in a specific frequency band of an output signal associated with previously assumed indicator sound.

Furthermore, as shown in FIG. 4A, the position acquisition unit 5 acquires an arrival time difference of indicator sound between the above-described microphones forming each pair when a peak appears with a small time difference in sound pressure levels in the respective first to fourth microphones 2A to 2D, i.e., when the indicator sound is detected. That is, the time difference acquisition unit 5a acquires a arrival time difference $t_{AC}$ of indicator sound between the first and third microphones 2A and 2C and an arrival time difference $t_{BD}$ of indicator sound between the second and fourth microphones 2B and 2D.

Giving a specific description, the time difference acquisition unit 5a, which counts a time elapsed from an arbitrary time point, acquires the arrival time difference $t_{AC}$ between the first and third microphones 2A and 2C by subtracting an elapsed time at a time point where the first microphone 2A detects indicator sound from an elapsed time at a time point where the third microphone 2C detects the indicator sound (a time point where a peak appears in the sound pressure level).

Therefore, the arrival time difference $t_{AC}$ between the first and third microphones 2A and 2C takes a positive value when an emission source (the indicated position P) of the indicator sound is closer to the first microphone 2A than the third microphone 2C and takes a negative value when the same is closer to the third microphone 2C than the first microphone 2A as shown in FIG. 3.

Further, the time difference acquisition unit 5a acquires the arrival time difference $t_{BD}$ between the second and fourth microphones 2B and 2D by subtracting an elapsed time at a time point where the second microphone detects indicator sound from an elapsed time at a time point where the fourth microphone detects the indicator sound.

Therefore, the arrival time difference $t_{BD}$ between the second and the fourth microphones 2B and 2D takes a positive value when the emission source (the indicated position P) of the indicator sound is closer to the second microphone 2B than the fourth microphone 2D and takes a negative value when the same is closer to the fourth microphone 2D than the second microphone 2B as shown in FIG. 3.

Here, the arrival time difference $t_{AC}$ between the first and third microphones 2A an 2C represents a distance difference to the indicated position P between the microphones, and the arrival time difference $t_{BD}$ between the second and fourth microphones 2B and 2D represents a distance difference to the indicated position P between these microphones. That is, an absolute value obtained by multiplying the arrival time difference ($t_{AC}$ or $t_{BD}$) of the indicator sound between one pair of microphones by an acoustic velocity is a distance difference to the indicated position P between the one pair of microphones.

A point at which a difference between distances from the first and third microphones 2A and 2C is constant is present on hyperbolas having focal points at both the microphones 2A and 2C, and a point at which a difference between distances from the second and fourth microphones 2B and 2D is constant is likewise present on hyperbolas having focal points at both the microphones 2A and 2C.

Figure 4B:
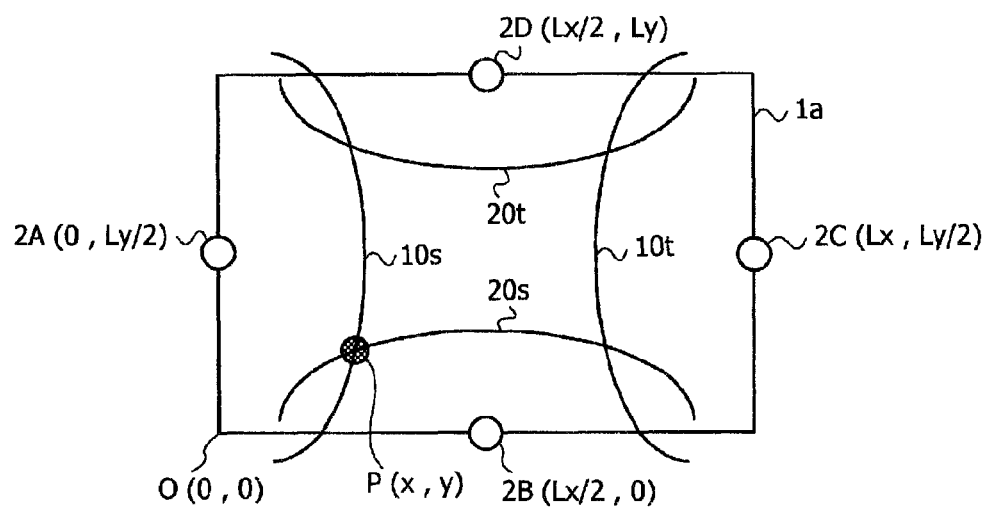
FIG. 4B is an explanatory view showing the acquisition method for an indicated position in the first embodiment.

Therefore, as shown in FIG. 4B, the indicated point P is an intersection of a hyperbola 10s which is closer to the indicated position P (which will be referred to as a first hyperbola hereinafter) in hyperbolas 10s and 10t having focal points at the first and third microphones 2A and 2C and a hyperbola 20s closer to the indicated position P (which will be referred to as a second hyperbola hereinafter) in hyperbolas 20s and 20t having focal points at the second and fourth microphones 2B and 2D. It is to be noted that one pair of hyperbolas 10s and 10t and the other pair of hyperbolas 20s and 20t depicted in FIG. 4B are shown for the sake of simplicity, and shapes or positional relationships of these hyperbolas are different from actual ones.

Assuming that $2a$ is a distance difference between distances from two focal points to points on the hyperbolas and $2c$ is a distance between both the focal points, the hyperbolas where the two focal points are present on an x axis in the YX coordinate system can be presented by the following Equation (1):

$$\frac{x^2}{a^2} - \frac{y^2}{b^2} = 1 \text{ (where } b^2 = c^2 - a^2\text{)} \quad (1)$$

On the other hand, since a distance (Lx) between the first and third microphones 2A and 2C is already known, assuming that a distance difference to the indicated position P is $2a_x$, the hyperbolas 10s and 10t having focal points at the first and third microphones 2A and 2C can be represented by the following Equation (2):

$$\frac{(x - L_x/2)^2}{a_x^2} - \frac{(y - L_y/2)^2}{b_x^2} = 1 \quad (2)$$

$$a_x = (1/2)C_0 t_{AC}$$

$$c_x = L_x/2$$

$$b_x = \sqrt{c_x^2 - a_x^2}$$

where $C_0$ is an acoustic velocity and $t_{AC}$ is an arrival time difference.

Likewise, since a distance (Ly) between the second and fourth microphones 2B and 2D is already known, assuming that a distance difference to the indicated position P is $2a_y$, the hyperbolas 20s and 20t having focal points at the second and fourth microphones 2B and 2D can be represented by the following Equation (3):

$$\frac{(x - L_x/2)^2}{b_y^2} - \frac{(y - L_y/2)^2}{a_y^2} = -1 \quad (3)$$

$$a_y = (1/2)C_0 t_{BD}$$

$$c_y = L_y/2$$

$$b_y = \sqrt{c_y^2 - a_y^2}$$

where $t_{BD}$ is an arrival time difference.

Therefore, a position (x) of the indicated position P as an indicator sound emission source on the x axis and a position (y) of the same on a y axis can be obtained by calculating the following Equation (4) and Equation (5), respectively:

$$x = -a_x b_y \sqrt{\frac{a_y^2 + b_x^2}{b_x^2 b_y^2 - a_x^2 a_y^2}} + L_x/2 \quad (4)$$

$$y = -a_y b_x \sqrt{\frac{a_x^2 + b_y^2}{b_x^2 b_y^2 - a_x^2 a_y^2}} + L_y/2 \quad (5)$$

Additionally, in Equation (4), since a value of a first term in a right-hand member is smaller than ($L_x/2$) when $a_x$ is a positive value, i.e., when the arrival time difference $t_{AC}$ is a positive value, the position (x) on the first hyperbola 10s close to the first microphone 2A shown in FIG. 4B can be obtained as a calculation result. Contrary, since the value of the first term in the right-hand member is larger than ($L_x/2$) when $a_x$ is a negative value, namely, when the arrival time difference $t_{AC}$ is a negative value, the position (x) on the hyperbola 10t close to the third microphone 2C shown in FIG. 4B can be obtained as a calculation result.

Likewise, in Equation (5), since the value of the first time in the right-hand member is smaller than ($L_y/2$) when ay is a positive value, i.e., when the arrival time difference $t_{BD}$ is a positive value, the position (y) on the second hyperbola 20s close to the second microphone 2b show in FIG. 4B can be obtained as a calculation result. Contrary, since the value of the first term on the right-hand member is larger than ($L_y/2$) when $a_y$ is a negative value, namely, when the arrival time difference $t_{BD}$ is a negative value, the position (y) on the hyperbola 20t close to the fourth microphone 2D shown in FIG. 4B can be obtained as a calculation result.

Therefore, as described above, in the position acquisition unit 5, after the time difference acquisition unit 5a acquires the arrival time difference ($t_{AC}$ or $t_{BD}$) of the indicator sound between each pair of microphones, the positional information acquisition unit 5b calculates Equation (4) and Equation (5) to acquire such a coordinate position (x, y) of the intersection of the first hyperbola 10s having focal points at the first and third microphones 2A and 2C and the second hyperbola 20s having focal points at the second and fourth microphones 2B and 2D as shown in FIG. 4B. That is, the position acquisition unit 5 acquires the coordinate position (x, y) of the arbitrary indicated position P. Further, the position acquisition unit 5 supplies the acquired coordinate position (x, y) to any other apparatus as indicated position information.

That is, the indicated position detecting apparatus according to the first embodiment includes a display module having a display screen; a plurality of microphones which are arranged at an outer peripheral portion of the display screen to be apart from each other and detect a contact sound to the display screen; a time difference acquisition unit which acquires arrival time differences of the contact sound between two microphones in each of two combinations of the plurality of microphones; and a positional information acquisition unit which derives two hyperbolas corresponding to the arrival time differences acquired by the time difference acquisition unit, each hyperbola having focal points at the two microphones in each of the two combinations of the plurality of microphones, and acquires an intersection of the two derived hyperbolas as information of a position where the contact sound is generated.

Furthermore, in the indicated position detecting apparatus according to the first embodiment, when an arbitrary position in the display screen 1a of the LCM 1 is indicated by, e.g., the stylus pen 30, the first to fourth microphones 2A to 2D detect indicator sound generated at the indicated position P, and the indicated position P is specified based on the arrival time difference of the indicator sound between each pair of microphones. Therefore, since the display screen 1a does not have to be covered with any other member, the indicated position in the display screen 1a can be detected without deteriorating display characteristics of the LCM 1.

It is to be noted that, whey carrying out the present invention, the configuration and others of the indicated position detecting apparatus described in this embodiment can be modified as follows.

For example, the two orthogonal straight lines L and M on which the respective pairs of the first to fourth microphones 2A and 2D are arranged, respectively, do not have to be present on the same plane. The two straight lines L and M may be present on different planes which are parallel to each other. Furthermore, the two straight lines L and M may be present on different planes which are not parallel to each other.

Moreover, the two straight lines L and M are convenient for the calculation of the coordinate position (x, y) of the indicated position P when they are orthogonal to each other like this embodiment. However, it is good enough for the two straight lines L and M to cross each other within the display screen 1a at least when they are projected onto the display screen 1a.

Figure 5:
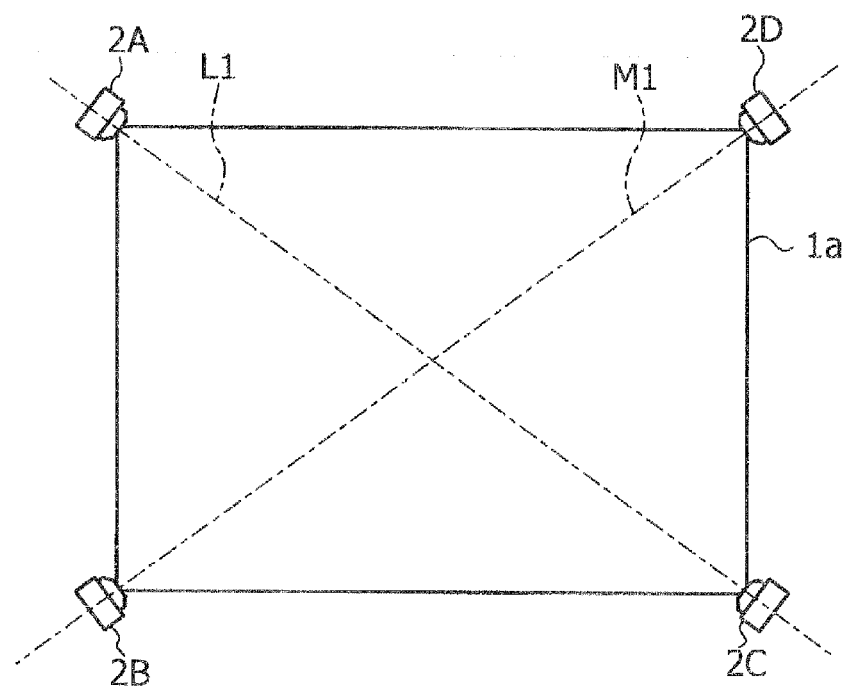
FIG. 5 is an arrangement plan showing another arrangement example of each microphone in the first embodiment.

Additionally, the first to fourth microphones 2A to 2D may be arranged at respective corner portions of the display screen 1a as depicted in FIG. 5. That is, the first to fourth microphones 2A to 2D may be arranged to form pairs on a straight line L1 including one diagonal line and a straight line M1 including the other diagonal line in the display screen 1a.

Further, installing positions of the first to fourth microphones 2A to 2D in the LCM 1 can be appropriately changed as long as the indicator sound that is generated on or near the display screen 1a can be detected when an indicator indicates an arbitrary position in the display screen 1a. That is, it is good enough for the first to fourth microphones 2A to 2D to be apart from each other, and they can be arranged at arbitrary positions on the outer periphery of the display screen 1a.

Further, in this embodiment, the intersection of the two different hyperbolas, i.e., the hyperbola (the first hyperbola 10s) having focal points at the first and third microphones 2A and 2C and the hyperbola (the second hyperbola 20s) having focal points at the second and fourth microphones 2B and 2D is detected as the indicated position in the display screen 1a.

Figure 6:
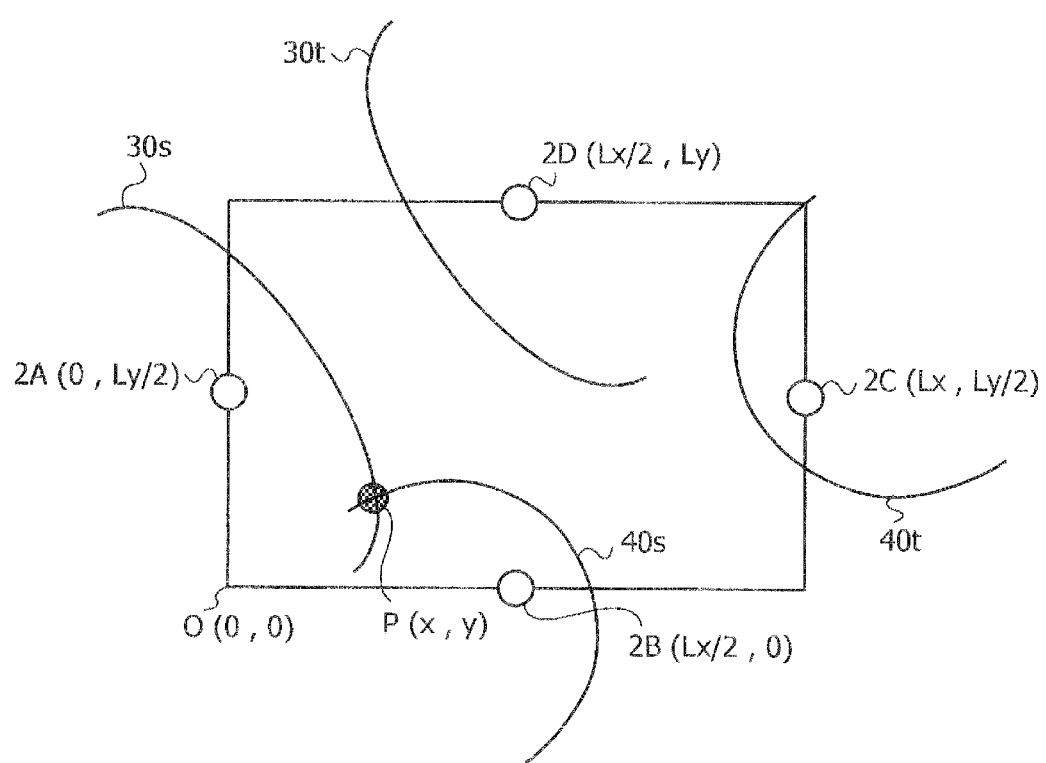
FIG. 6 is an explanatory view showing another combination of a pair of microphones as hyperbola calculation targets.

However, for example, as shown in FIG. 6, the two different hyperbolas as targets for calculating the coordinate position (x, y) of the intersection (the indicated position P) may be a hyperbola 30s or 30t having focal points at the first and fourth microphones 2A and 2D and a hyperbola 40s or 40t having focal points at the second and third microphones 2B and 2C. That is, a combination of a pair of microphones as hyperbolic calculation targets can be appropriately changed, and the indicated position P may be specified based on an arrival time difference of the indicator sound between the first and fourth microphones 2A and 2D and an arrival time difference of the indicator sound between the second and third microphones 2B and 2C, for example. It is to be noted that the one hyperbola 30s or 30t and the other hyperbola 40s or 40t depicted in FIG. 6 are shown for the sake of simplicity like those depicted in FIG. 4B, and shapes or positional relationships of the hyperbolas are different from actual ones.

Furthermore, an arbitrary combination can be likewise adopted as a combination of one pair of microphones as hyperbolic calculation targets in a case of arranging the first to fourth microphones 2A to 2D at the respective corner portions of toe display screen 1a as shown in FIG. 5.

Moreover, when functions as a control unit and a correction unit in the present invention are added to the position acquisition unit 5, the position acquisition unit 5 may acquire a coordinate position (x, y) of an arbitrary indicated position P by the following processing different from this embodiment at the time of detecting the indicator sound.

For example, the position acquisition unit 5 is allowed to execute processing of calculating a coordinate position (x, y) of an intersection (the indicated position P) of two different hyperbolas shown in FIG. 4B and acquiring a calculation result as first indicated position information based on the procedure described in this embodiment. Subsequently, a combination of one pair of microphones as the hyperbolic calculation targets is changed to, e.g., another combination shown in FIG. 6, and then the position acquisition unit 5 is allowed to calculate a coordinate position (x, y) of an intersection (the indicated position P) of two different hyperbolas in accordance with the same fundamental rules as this embodiment. That is, the position acquisition unit 5 is allowed to execute processing of calculating the coordinate position (x, y) of the intersection (the indicated position P) of the two different hyperbolas based on an arrival time difference of the indicator sound between the first and fourth microphones 2A and 2D and an arrival time difference of the indicator sound between the second and third microphones 2B and 2C and acquiring a calculation result as second indicated position information.

Thereafter, the position acquisition unit 5 is operated to calculate an x coordinate of an intermediate point between an x coordinate in the first indicated position information and an x coordinate in the second indicated position information and acquire a calculation result as a corrected x coordinate. At the same time, the position acquisition unit 5 is operated to calculate a y coordinate of an intermediate point between a y coordinate in the first indicated position information and a y coordinate in the second indicated position information and acquire a calculation result as a corrected y coordinate. In other words, the position acquisition unit 5 is operated to execute processing of correcting the first indicated position information by using the second indicated position information and acquiring the corrected x coordinate and the corrected y coordinate as third indicated position information. Additionally, the position acquisition unit 5 is operated no supply the corrected coordinate position (x, y) acquired as the third indicated position information to any other apparatus as final indicated position information.

As described above, a combination of one pair of microphones as hyperbolic calculation targets is changed to acquire the first indicated position information and the second indicated position information, and the acquired first indicated position information is corrected by using the second indicated position information to acquire the final indicated position information (the third indicated position information), thereby improving a detection accuracy of the indicated position on the display screen 1a.

Further, although the configuration where the four microphones are utilized to detect an indicated position has been described in this embodiment, the number of microphones provided at the outer periphery of the display screen 1a may be three. When utilizing the three microphones to detect an indicated position, two pairs of microphones as hyperbolic calculation targets may be constituted of a first pair of a first microphone and a second microphone and a second pair of the first microphone and a third microphone.

Furthermore, in this embodiment, the configuration that acquires a coordinate position (x, y) in the XY coordinate system as indicated position information representing an arbitrary indicated position in the display screen 1a has been described. However, when carrying out the present invention, one pair of microphones which are apart from each other alone may be arranged at the outer periphery of the display screen 1a, and information indicative of a rough position of an arbitrary position in the display screen 1a that can be determined based on information of hyperbolas having focal points at the pair of microphones may be acquired as indicated position information representing the arbitrary indicated position.

The information indicative of the rough position that can be determined based on the hyperbolic information having focal points at one pair of microphones is, e.g., information indicative of either an upper half region or a lower half region of the display screen 1a in which an arbitrary indicated position is present or information indicative of either a left half region or a right half region of the display region 1a in which an arbitrary indicated position is present.

Further, the information indicative of the rough position that can be determined based on the hyperbolic information having focal points at one pair of microphones is, e.g., information indicative of a specific block (blocks) in which an arbitrary indicated position may be possibly present when the display screen 1a is divided into the blocks in vertical and horizontal directions.

Furthermore, the position acquisition unit 5 described in this embodiment may configure, e.g., an arbitrary apparatus including the LCM 1, and it may be constituted of a microcomputer and the like included in an arbitrary apparatus (including a personal computer).

Moreover, the indicator sound detected by the first to fourth microphones 2A to 2D may have characteristics in a frequency band in an audible range or may have characteristics in a frequency band in a non-audible range.

Additionally, although the indicated position detecting apparatus that detects an arbitrary indicated position in the display screen of the LCM 1 has been described in this embodiment, the present invention can be also used for detecting an arbitrary indicated position in a display screen of any other display device such as CRT than the LCM 1.

Second Embodiment

Figure 7:
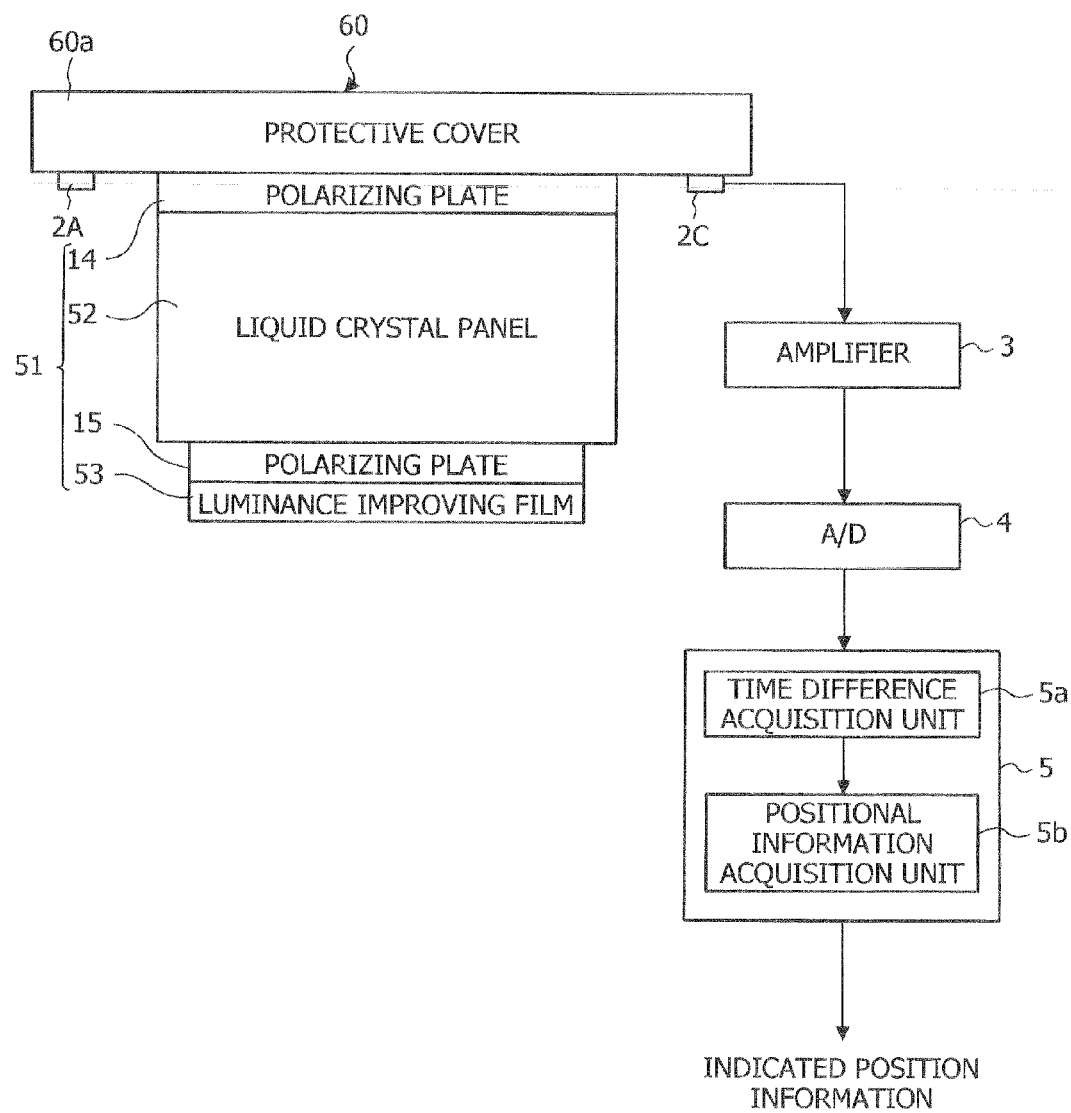
FIG. 7 is a structural view showing an indicated position detecting apparatus according to a second embodiment.

FIG. 7 is a schematic structural view showing a second embodiment of an indicated position detecting apparatus according to the present invention. This embodiment relates to an example where an indicated position detecting apparatus according to the present invention is applied to an LCM 51 having a display screen protected by a protective cover 60.

As shown in FIG. 7, the LCM 51 is of a transmission type and constituted of a liquid crystal panel 32, polarizing plates 14 and 15 attached to a front surface side and a back surface side of the liquid crystal panel 52 and a luminance improving film 53 attached to the polarizing plate 15 on the back surface side. A surface of the polarizing plate 14 on the front surface side is covered with the protective cover 60.

Although not shown in FIG. 7, the liquid crystal panel 52 is formed of two transparent glass substrates 11 and 12, a liquid crystal 13 interposed between the two glass plates 11 and 12, a pixel electrode 16, TFTs 17, color filters 18, and a common electrode 19 which are described in the first embodiment.

The luminance improving film 53 is, e.g., a PET (Poly Ethylene Terephtalate) film obtained by laminating an acrylic resin, and it improves luminance of the liquid crystal panel 52 by condensing light emitted from a non-illustrated surface light source formed of a light guide plate or a backlight.

Figure 8A:
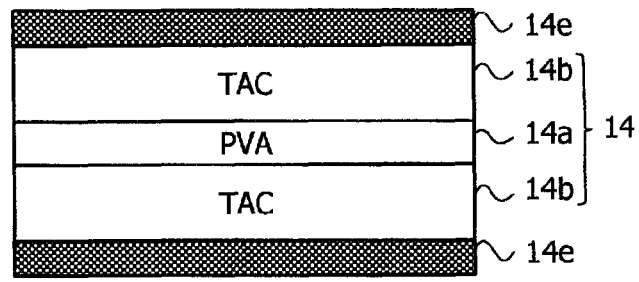
FIG. 8A is an explanatory view showing a specific structural example of a polarizing plate.
Figure 8B:
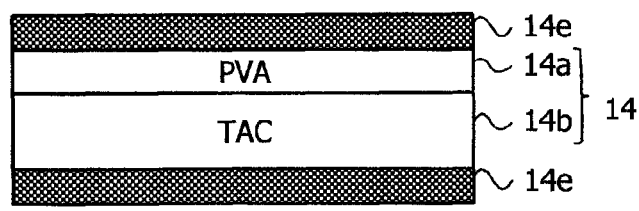
FIG. 8B is an explanatory view showing a specific structural example of a polarizing plate.
Figure 8C:
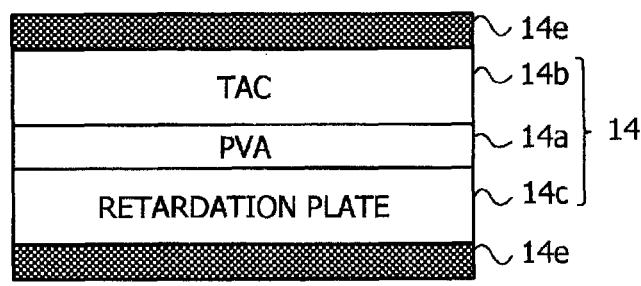
FIG. 8C is an explanatory view showing a specific structural example of a polarizing plate.

The polarizing plate 14 attached to the front surface side of the liquid crystal panel 52 has a configuration shown in, e.g., FIG. 8A, FIG. 8B, or FIG. 8C. For example, as depicted in FIG. 8A, the polarizing plate 14 has a three-layer structure reinforced by attaching TAC (Fri Acetyl Cellulose) films 14b and 14b to upper and lower sides of a PVA (Poly Vinyl Alcohol) film 14a having polarizing performance provided thereto, and it is configured to be bonded to the liquid crystal panel 52 and the protective cover 60 through a transparent adhesive 14e.

Further, for example as shown in FIG. 8B, the polarizing plate 14 has a two-layer structure reinforced by attaching a TAC film 14b to a back surface of a PVA film 141 having polarizing performance provided thereto, and it is configured to be bonded to the liquid crystal panel 52 and the protective cover 60 through a transparent adhesive 14e.

Furthermore, for example, as shown in FIG. 8C, the polarizing plate 14 has a three-layer structure in which a PVA film 14a having polarizing performance provided thereto and a reinforcing TAC film 14b are sequentially attached to a retardation plate 14c, and it is configured to be bonded to the liquid crystal panel 52 and the protective cover 60 through a transparent adhesive 14e.

The protective cover 60 is, e.g., a transparent plate material formed of glass or plastic, and it is bonded to the polarizing plate 14 on the front surface side. Moreover, the protective cover 60 is secured to a main body or a housing of an arbitrary apparatus in which the LCM 51 is provided, and it has an area larger than that of the polarizing plate 14 on the front surface side.

Additionally, in this embodiment, four microphones, i.e., first and third microphones 2A and 2C shown in FIG. 7 and second and fourth microphones which are not depicted in FIG. 7 are secured on a back surface of a peripheral portion 60a of the protective cover 60 placed on an outer side apart from a periphery of the polarizing plate 14 on the front surface side.

Positions of the four microphones on a plane are provided at the center of each side of a display screen (the surface of the polarizing plate 14 on the front surface side) of the LCM 51 like the first embodiment (see FIG. 2A). However, the four microphones are arranged to form respective pairs on two straight lines that are present on the same plane facing that back surface side of the display screen (the surface of the polarizing plate 14 on the front surface side) of the LCM 51.

Further, in this embodiment, the four microphones including the first and third microphones 2A and 2C, an amplifier 3 connected with the four microphones, an A/D converter 4, and a position acquisition unit 5 constitute the indicated position detecting apparatus. It is to be noted that the amplifier 3, the A/D converter 4, and the position acquisition unit 5 have the same configurations and functions as those in the first embodiment.

In this embodiment having the above-described configuration, when an arbitrary position in the display screen of the LCM 51 is indicated by an indicating device such as a stylus pen 30 or a fingertip, the four microphones provided on the back surface of the peripheral portion 60a of the protective cover 60 detect indicator sound. Furthermore, the position acquisition unit 5 calculates a coordinate position (x, y) which is indicated position information representing an indicator sound generation source by the same method as that of the first embodiment. Therefore, the display screen of the LCM 51 does not have to be covered with a film having an electrode grating provided thereto, and the indicated position in the display screen can be detected without deteriorating display characteristics of the LCM 51.

It is to be noted that, even in a situation where the four microphones are provided on the back surface of the peripheral portion 60a of the protective cover 60 like this embodiment, the four microphones can be arranged at arbitrary positions on the outer peripheral portion of the display screen of the LCM 51 like the first embodiment. For example, the four microphones may be arranged at respective corner portions of the display screen (see FIG. 5). Furthermore, the four microphones do not have to be necessarily arranged on the same plane.

Moreover, ever in a situation where the four microphones are provided on the back surface of the peripheral portion 60a of the protective cover 60 like this embodiment, various kinds of arithmetic operation methods described in the first embodiment can be adopted as a specific arithmetic operation method when the position acquisition unit 5 calculates a coordinate position (x, y) representing an indicator sound generation source. Additionally, the position acquisition unit 5 may acquire a rough position described in the first embodiment as the indicated position information representing the indicator sound generation source.

Further, the number of microphones provided on the back surface of the peripheral portion 60a of the protective cover 60 may be three.

On the other hand, in the LCM 51 described in this embodiment, the protective cover 60 protects the liquid crystal panel 52 against the shock given by an indicating device, e.g., the stylus pen 30 or a fingertip. Therefore, as a glass substrate constituting the liquid crystal panel 52, one having a thickness which is as small as approximately 0.7 mm or 0.5 mm can be used. Furthermore, the protective cover 60 can protect the LCM 51 as long as a thickness which is approximately 0.20 mm is assured for the protective cover 60. Therefore, when each of the polarizing plates 14 and 15 has a thickness of 0.17 mm and the luminance improving film 53 has a thickness of 0.06 mm, an overall thickness of the protective cover 60 and the LCM 51 can be approximately 2.0 mm to 1.60 mm.

Third Embodiment

Although the example where an indicated position on the two-dimensional plane of the display screen is detected as the indicated position has been described in the first embodiment and the second embodiment, an example where an indicated position in a space overlapping a display screen, i.e., a three-dimensional space above the display screen is detected as an indicated position will be described in the following third embodiment.

Figure 9:
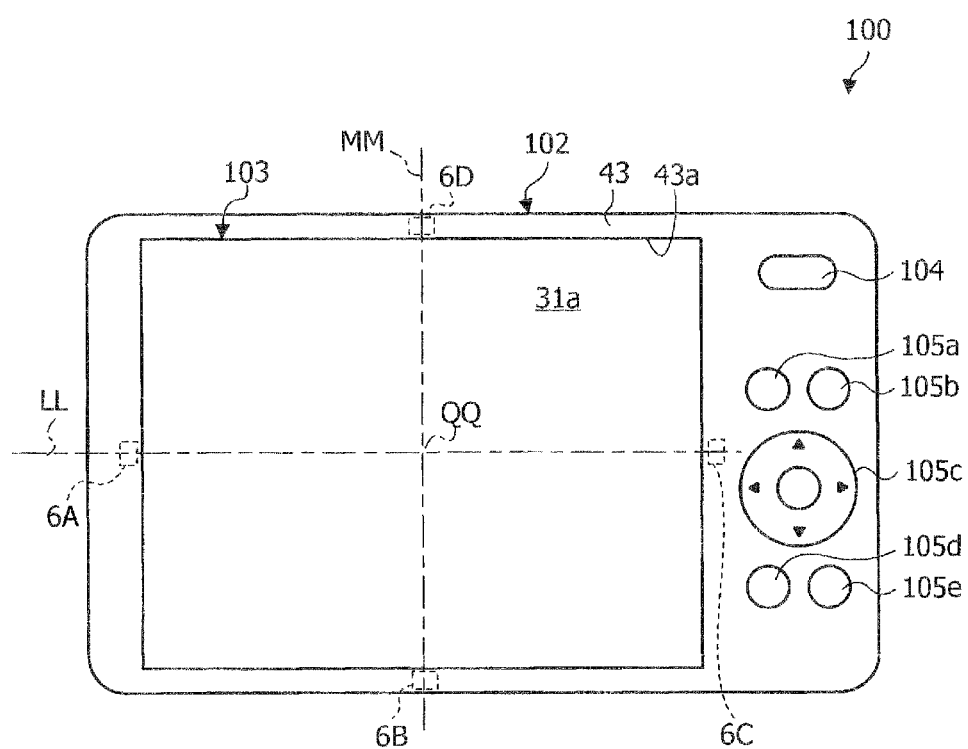
FIG. 9 is a structural view showing a personal digital assistant according to a third embodiment.

FIG. 9 is a structural view showing a personal digital assistant 100 having a configuration as an indicated position detecting apparatus or a configuration as a display apparatus. The personal digital assistant 100 includes various functions such as a schedule management function, a data reference function for dictionaries and others, a pen input function, and others, and it has the following configuration.

As shown in FIG. 9, a main body 102 of the personal digital assistant 100 is horizontally long, and a horizontally long display unit 103 which displays various kinds of information such as textual information or image information, a power supply button 104, and operation keys 105a to 105e used by a user when operating the personal digital assistant 100 are provided on a surface of the main body 102.

Moreover, first to fourth microphones 6A to 6D are provided at an outer peripheral portion of the display unit 103.

Figure 10:
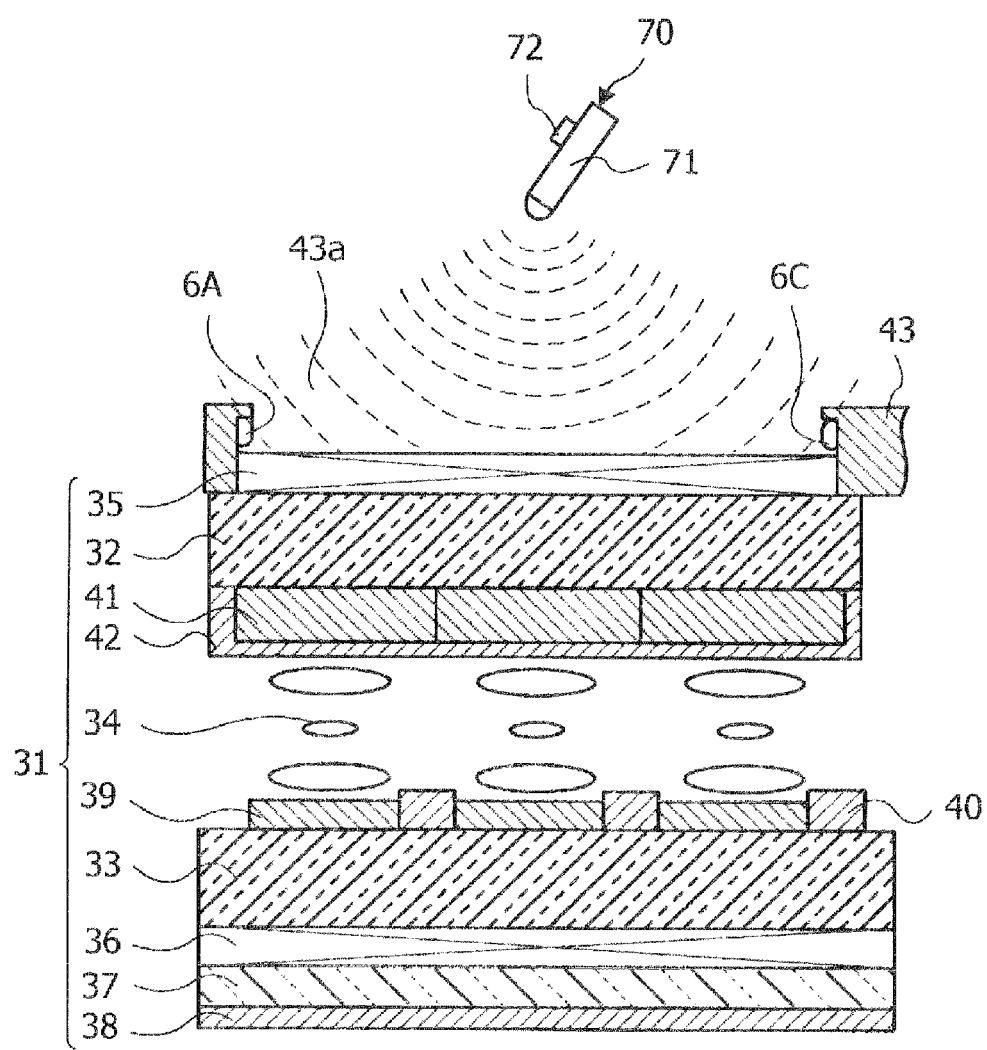
FIG. 10 is a cross-sectional view showing an outline configuration of a display unit in the third embodiment.

FIG. 10 is a cross-sectional view showing an outline configuration of the display unit 103. The display unit 103 is formed of an LCM 31 that can perform color display. The LCM 31 is constituted of two transparent glass substrates 32 and 33 on a front side and a back side, a liquid crystal 34 interposed between the two glass plates 32 and 33, polarizing plates 35 and 36 attached to outer surfaces of the glass plates 32 and 33, a light guide plate 37 provided on a back surface of the polarizing plate 36 on the back side, and a light reflecting sheet 38. It is to be noted that a light source such as an LED (a light emitting diode) is arranged on a non-illustrated outer peripheral portion of the light guide plate 37.

A pattern of a transparent pixel electrode 39 is formed on an inner surface of the glass substrate 33 on the back side, and TFTs 40 are formed at portions associated with pixels in the pixel electrode 39, respectively. Patterns of color filters 41 having a predetermined color alignment and a transparent common electrode 42 are sequentially formed as layers on an inner surface of the glass substrate 32 on the front side.

A periphery of the polarizing plate 35 on the front side of the LCM 31 is covered with a frame cover 43 constituting a surface of the main body 2. A display window 43a from which the polarizing plate 35 on the front side is exposed is opened in the frame cover 43, and the first to fourth microphones 6A to 6D are arranged on an inner side of the display window 43a. It is to be noted that, in the personal digital assistant 100, a rectangular region on a display surface (a surface of the polarizing plate 35 on the front side) of the LCM 31 that can be seen through the display window 43a is a display screen 31a.

As shown in FIG. 9, the first to fourth microphones 6A to 6D are orthogonal to each other at a center QQ of the display screen 31a, and they are arranged to form respective pairs on two straight lines LL and MM that are present on a plane parallel to the display screen 31a, i.e., the same plane facing the display screen 31a. That is, the first and third microphones 6A and 6C are arranged to form a pair on one straight line LL parallel to wide sides of the display screen 31a, and the second and fourth microphones 6B and 6D are arranged to form a pair on the other straight line MM parallel to narrow sides of the display screen 31a. It is to be noted that FIG. 10 is a cross-sectional view taken along the straight line LL.

The first to fourth microphones 6A to 6D are configured to individually detect indicator sound emitted from the stylus pen 70 depicted in FIG. 10 that is prepared in association with the personal digital assistant 100.

The stylus pen 70 is used when a user utilizes the pen input function of the personal digital assistant 100 to input textual information and others, and it includes a pen type main body 71 and a small push switch 72 provided on an peripheral surface of the main body 71. It is to be noted that the push switch 72 is of an autoreturn type that maintains an operating state only when it is being pushed by the user.

The non-illustrated inside of the main body 71 of the stylus pen 70 has a built-in small power supply and a built-in indicator sound generation circuit which is arranged at an end portion of the main body 71 and includes a sound discharge unit such as a small speaker or a buzzer that generates indicator sound when the push switch 72 is pushed. Further, the stylus pen 70 operates to cyclically emit indicator sound in a specific frequency band at fixed time intervals (n times/second) during a period that the push switch 72 is being pushed.

Figure 11:
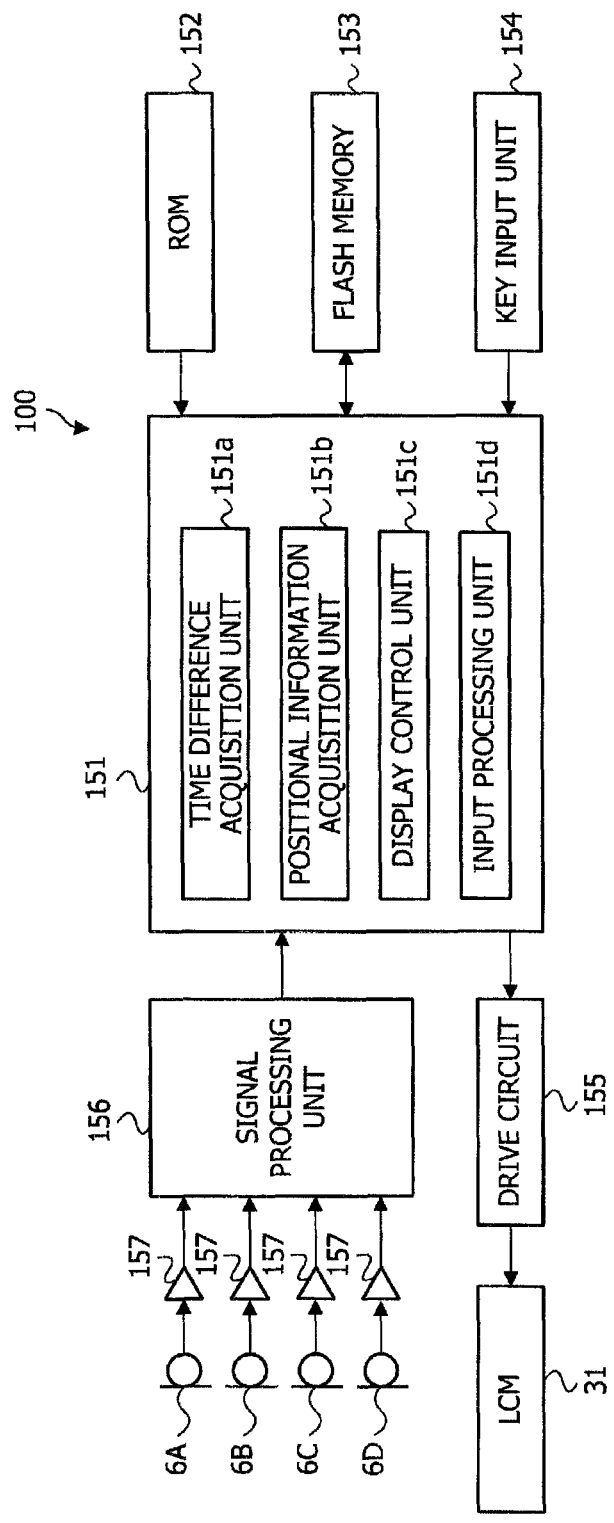
FIG. 11 is a block diagram showing an outline of an electrical configuration of the personal digital assistant in the third embodiment.

FIG. 11 is a block diagram showing an outline of an electrical configuration of the personal digital assistant 100. The personal digital assistant 100 includes a control unit 151 that controls the entire apparatus, an ROM (a Read Only Memory) 152, a flash memory 153, a key input unit 154, a drive circuit 155, and a signal processing unit 156. The LCM 31 is connected to the drive circuit 155, and the first to fourth microphones 6A to 61D are connected to the signal processing unit 156 through amplifiers 157, respectively.

The control unit 151 is formed of a CPU (a Central Processing Unit) and its peripheral circuit. The control unit 151 controls operations of the personal digital assistant 100 in accordance with various kinds of control programs stored in the ROM 152, and it also functions as a time difference acquisition unit 151a and a positional information acquisition unit 151b according to the present invention. The control program is formed of basic software (OS: Operating System) required for controlling the personal digital assistant 100 and pieces of application software configured to realize each function of the personal digital assistant 100. It is to be noted that the ROM 152 stores various kinds of data such as dictionary data besides the control program.

The flash memory 153 is a nonvolatile semiconductor memory that stores setting data that provides operations of the personal digital assistant 100 or textual information and others input by a user.

The key input unit 154 is operation keys 105a to 105e shown in FIG. 9, and it supplies an operation signal associated with an operation key operated by the user to the control unit 151.

The drive circuit 155 generates a drive signal configured to drive the LCM 31 in response to a command from the control unit 151 and supplies the generated drive signal to the LCM 31 to display predetermined textual information or image information in the display screen 31a.

The signal processing unit 156 converts output signals from the first to fourth microphones 6A to 6D amplified by the amplifiers 157, i.e., analog acoustic signals into digital signals, performs filter processing such as noise removal, and supplies the acoustic signals subjected to the filter processing to the control unit 151.

Moreover, in the personal digital assistant 100, when the user utilizes the pen input function, the first to fourth microphones 6A to 6D detect indicator sound emitted from the stylus pen 70, and the control unit 151 acquires indicated position information representing an indicated position with respect to the display screen 31a which is provided when the user indicates a position at which the indicator sound is emitted.

Figure 12A:
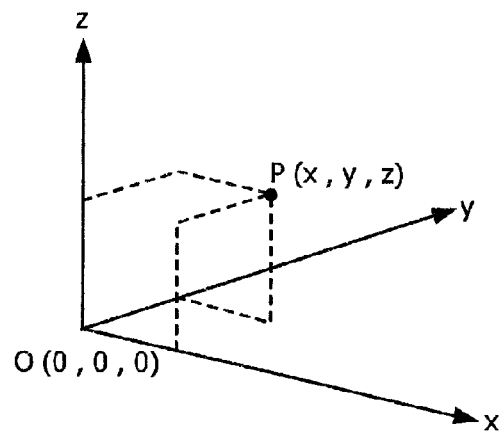
FIG. 12A is a view showing a position of an arbitrary indicated position in a three-dimensional space.
Figure 12B:
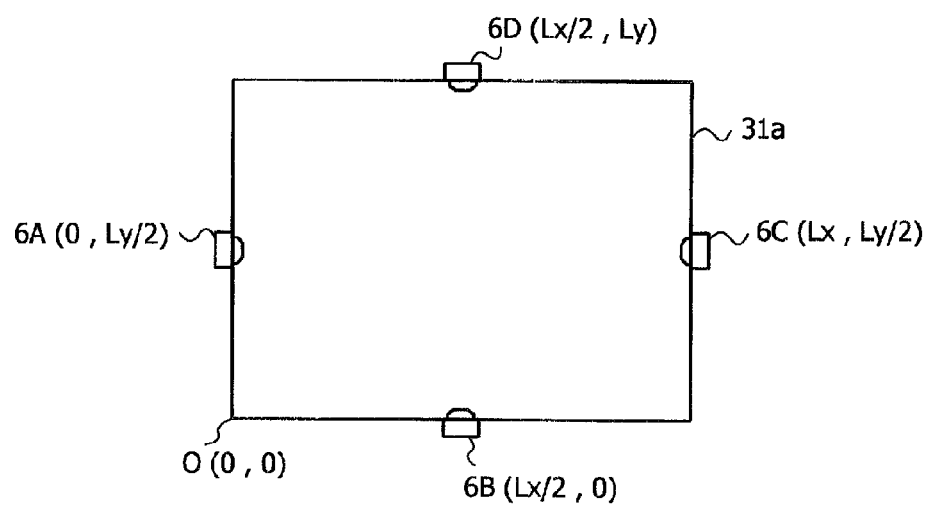
FIG. 12B is a view showing a coordinate position of each microphone in an XY coordinate system in the third embodiment.

The indicated position information acquired by the control unit 151 represents an arbitrary indicated position in a three-dimensional space. That is, the indicated position information is a coordinate position P (x, y, z) of Cartesian coordinates as shown in FIG. 12A, and it is a coordinate position when a lower left corner of the display screen 31a is an origin (0, 0, 0), each wide side of the display screen 31a is an x axis, and each narrow side of the display screen 31a is a y axis. It is to be noted that FIG. 12B is a view showing coordinate positions of the first to fourth microphones 6A to 6D on an XY plane in the Cartesian coordinates.

An indicated position information acquiring method in the control unit 151 will now be described. When the stylus pen 70 emits indicator sound at an arbitrary position, the indicator sound is propagated in each direction at a uniform velocity (an acoustic velocity). At this time, in a case where there is a difference between distances from the indicator sound emitted position to the respective first to fourth microphones 6A to 6D, when any two microphones form a pair, a difference is produced in the indicator sound arrival times in the microphones in each pair.

Figure 13A:
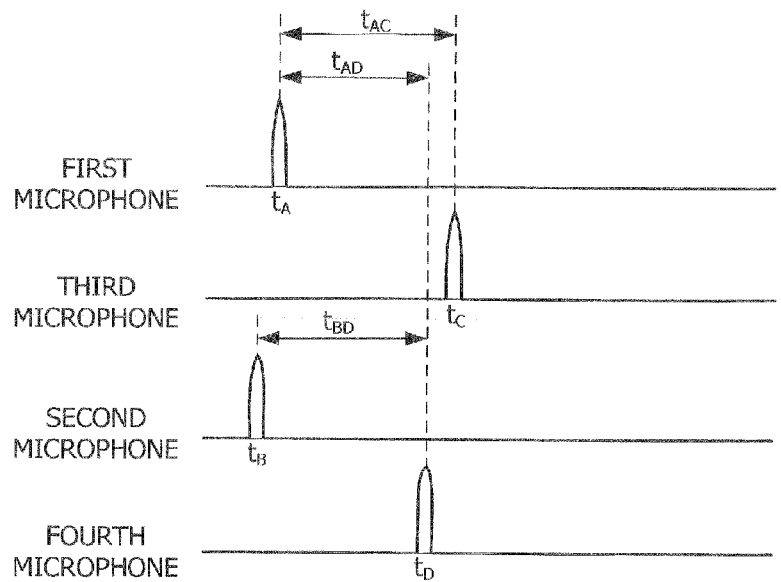
FIG. 13A is an explanatory view showing an acquisition method for indicated position information in the third embodiment.

FIG. 13A is a view showing changes in sound pressure levels in the output signals from the first to fourth microphones 6A to 6D when the indicator sound is generated and arrival time differences of the indicator sound in the respective predetermined pairs of microphones for the sake of simplicity. In FIG. 13A, an abscissa represents a time whilst an ordinate represents a sound pressure level, a time point at which each sound pressure level reaches a peak ($t_A$, $t_B$, $t_C$, or $t_D$) is a time point at which the indicator sound is detected by each of the first to fourth microphones 6A to 6D, and in is a time point at which the indicator sound arrives in this embodiment. It is to be noted that the sound pressure level is a sound pressure level in a predetermined frequency band of the indicator sound generated by the stylus pen 70.

Additionally, in FIG. 13A, $t_{AC}$ is an arrival time difference of the indicator sound between one pair of microphones consisting of the first and third microphones 6A and 6C, $t_{BD}$ is likewise an arrival time difference of the indicator sound between one pair of microphones consisting of the second and fourth microphones 6B and 6D, and $t_{AD}$ is an arrival time difference of the indicator sound between one pair of microphones consisting of the first and fourth microphones 6A and 6D.

Further, when the arrival time difference ($t_{AC}$, $t_{BD}$, or $t_{AD}$) of the indicator sound between each pair of microphones is multiplied by an acoustic velocity, a distance difference from an indicator sound emitted position between each pair of microphones can be obtained.

Here, a point in a space having a constant distance difference from the first and third microphones 6A and 6C is present on a hyperboloid (a hyperboloid of two sheets) having focal points at the first and third microphones 6A and 6C. Likewise, a point in a space having a constant distance difference from the second and fourth microphones 6B and 6D is present on a hyperboloid having focal points at the second and fourth microphones 6B and 6D. Further, a point in a space having a constant distance difference from the first and fourth microphones 6A and 6D is present on a hyperboloid having focal points at the first and fourth microphones 6A and 6D.

Figure 13B:
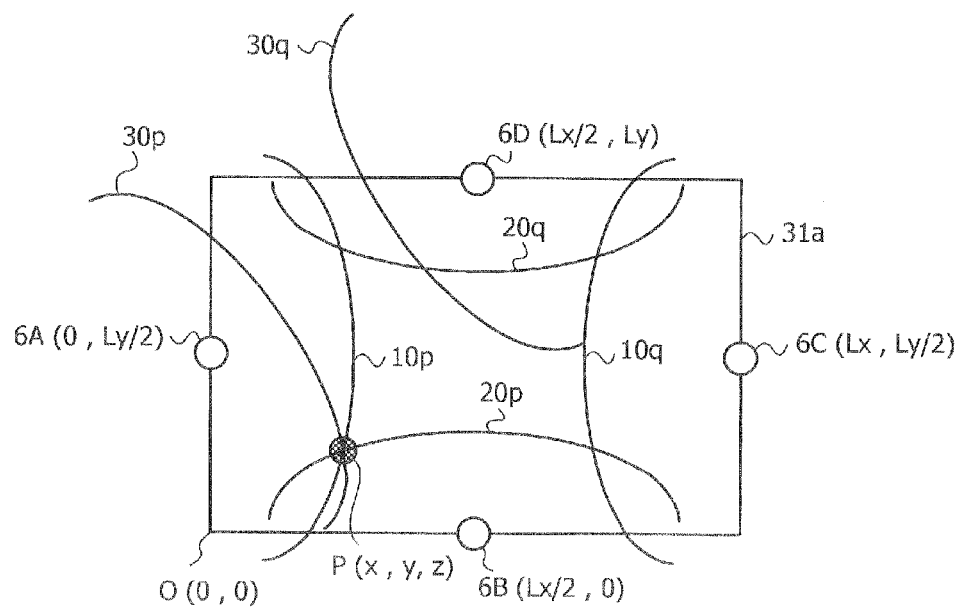
FIG. 13B is an explanatory view showing the acquisition method for indicated position information in the third embodiment.

Therefore, an intersection of the hyperboloids having focal points at the respective pairs of microphones is the indicator sound emitted position, i.e., the indicated position with respect to the display screen 31a. That is, FIG. 13B is a view showing a section when each hyperboloid having focal points at each pair of microphones is cut along a plane parallel to the display screen 31a, i.e., hyperbolas. As shown in FIG. 13B, an intersection of a first hyperboloid (a hyperbola) 10p or 10q having focal points at the first and third microphones 6A and 6C, a second hyperboloid (a hyperbola) 20p or 20q having focal points at the second and fourth microphones 6B and 6D, and a third hyperboloid (a hyperbola) 30p or 30q having focal points at the first and fourth microphones 6A and 6D is the indicated position P. It is to be noted that FIG. 13B just shows each hyperboloid (each hyperbola) for the sake of simplicity, and shapes or positional relationships are different from actual ones.

On the other hand, each hyperboloid having focal points at each pair of microphones can be represented by the following Equation (6). However, Equation (6) is a general equation when focal points are present on the z axis.

$$-\frac{x^2}{a^2} - \frac{y^2}{b^2} + \frac{z^2}{c^2} = 1 \quad (6)$$

Furthermore, since a distance ($L_x$) between the first and third microphones 6A and 6C is already known, assuming that a distance difference to the indicated position P between these microphones is $2a_x$, the following Equation (7) can be obtained as an equation that represents the first hyperboloid 10p or 10q having focal points at the first and third microphones 6A and 6C.

$$\frac{(x-L_x/2)^2}{a_x^2} - \frac{(y-L_y/2)^2}{b_x^2} - \frac{z^2}{b_x^2} = 1 \quad (7)$$

$$a_x = (1/2)C_0 t_{AC}$$

$$c_x = L_x/2$$

$$b_x = \sqrt{c_x^2 - a_x^2}$$

Likewise, since a distance ($L_y$) between the second and fourth microphones 6B and 6D is already known, assuming that a distance difference to the indicated position P between these microphones is $2a_y$, the following Equation (8) can be obtained as an equation that represents the second hyperboloid 20p or 20q having focal points at the second and fourth microphones 6B and 6D.

$$\frac{(x-L_x/2)^2}{a_y^2} - \frac{(y-L_y/2)^2}{b_y^2} - \frac{z^2}{b_y^2} = -1 \quad (8)$$

$$a_y = (1/2)C_0 t_{BD}$$

$$c_y = L_y/2$$

$$b_y = \sqrt{c_y^2 - a_y^2}$$

On the other hand, assuming that the first and fourth microphones 6A and 6D are placed on the x axis, the first microphone 6A is placed at the origin (0, 0, 0), a distance between the first and fourth microphones 6A and 6D is a distance (x), and a distance difference to the indicator point P is $2a_{xy}$, the following Equation (9) can be obtained as an equation representing a virtual hyperboloid having focal points at the first and fourth microphones 6A and 6D from Equation (6).

$$\frac{X^2}{a_{xy}^2} - \frac{Y^2}{b_{xy}^2} - \frac{Z^2}{b_{xy}^2} = 1 \quad (9)$$

$$a_{xy} = (1/2)C_0 t_{AD}$$

$$c_{xy} = (1/4)\sqrt{L_x^2 + L_y^2}$$

$$b_{xy} = \sqrt{c_{xy}^2 + a_{xy}^2}$$

Moreover, a coordinate position (x, y, z) of each point that is present on the virtual hyperboloid can be converted into a coordinate position (x, y, z) on the actual third hyperboloid 30p or 30q having focal points at the first and fourth microphones 6A and 6D by using the following Equation (10).

$$\begin{pmatrix} x \\ y \\ z \end{pmatrix} = \begin{pmatrix} \cos\theta & -\sin\theta & 0 \\ \sin\theta & \cos\theta & 0 \\ 0 & 0 & 1 \end{pmatrix} \begin{pmatrix} X \\ Y \\ Z \end{pmatrix} - \begin{pmatrix} L_x/4 \\ 3L_y/4 \\ 0 \end{pmatrix} \quad (10)$$

$$\theta = \tan^{-1}(L_y/L_x)$$

Therefore, the following equation (11) can be obtained as an equation representing the third hyperboloid 30p or 30q having focal points at the first and fourth microphones 6A and 6D from Equation (9) and Equation (10).

$$\left(\frac{\cos^2\theta}{a_{xy}^2} - \frac{\sin^2\theta}{b_{xy}^2}\right)x^2 + \quad (11)$$

$$\left(\frac{2}{a_{xy}^2} - \frac{2}{b_{xy}^2}\right)\cos\theta \cdot \sin\theta \cdot xy + \left(\frac{\cos^2\theta}{a_{xy}^2} - \frac{\sin^2\theta}{b_{xy}^2}\right)y^2 -$$

$$\frac{L_x \cos\theta}{2a_{xy}^2}x - \frac{3L_y \sin\theta}{2b_{xy}^2}y + \frac{L_x^2}{16a_{xy}^2} - \frac{9L_x^2}{16b_{xy}^2} - \frac{1}{b_{xy}^2}z^2 = 1$$

Therefore, the coordinate (x, y, z) that satisfies all of Equation (7), Equation (8), and Equation (11) is the intersection of the respective hyperboloids having focal points at the respective pairs of microphones and the indicator sound emitted position, i.e., the coordinate (x, y, z) of the arbitrary indicated position P with respect to the display screen 31a.

However, if the arrival time difference ($t_{AC}$, $t_{BD}$, or $t_{AD}$) of each pair of microphones has an error, an error is produced in the distance difference ($2a_x$, $2a_y$, or $2a_{xy}$) from the indicator sound emitted position between each pair of microphones, and hence the coordinate position (x, y, z) that satisfies all of Equation (7), Equation (8), and Equation (11) cannot be obtained.

Therefore, the control unit 151 utilizes the following Equation (12) to acquire the coordinate position (x, y, z) of the arbitrary indicated position P, i.e., indicated position information.

$$n = \{F(x,y,z)\}^2 + \{G(x,y,z)\}^2 + \{H(x,y,z)\}^2$$

where $F(x,y,z)$=(the left side)−(the right side) of Equation (6)

$G(x,y,z)$=(the left side)−(the right side) of Equation (6)

$H(x,y,z)$=(the left side)−(the right side) of Equation (6) (12)

The above Equation (12) is a discriminant which can be obtained from the arrival time difference ($t_{AC}$, $t_{BD}$, or $t_{AD}$) between each pair of microphones and by which a calculation result (n) becomes 0 (a specific value) when the distance difference ($2a_x$, $2a_y$, or $2a_{xy}$) from the indicator sound emitted position between each pair of microphones has no error.

A specific procedure when the control unit 151 acquires the indicated position information is as follows. That is, the control unit 151 sequentially assigns coordinate values from (0, 0, 0) to ($L_x$, $L_y$, $L_z$) to the coordinate value (x, y, z) in Equation (12) to obtain each calculation result (n). Here, a z coordinate ($L_z$) in the coordinate value ($L_x$, $L_y$, $L_z$) is a maximum coordinate value previously determined as a detection range in the z axis of the indicated position. That is, the control unit 151 sequentially assigns coordinate values representing respective points in a three-dimensional space in a fixed range above the display screen 31a to the coordinate value (x, y, z) in Equation (12) to obtain each calculation result (n). Moreover, the control unit 151 acquires as the indicated position information a coordinate value (x, y, z) when the calculation result (n) is minimum.

Meanwhile, in the personal digital assistant 100, three types of operating modes, i.e., a soft key mode, a brush style mode, and a line drawing mode are prepared as operating modes for using the pen input function, and a user can set an arbitrary operating mode as required when using the pen input function. The soft key mode is an operating mode prepared to input characters or symbols, and the brush style mode and the line drawing mode are operating modes prepared to input line drawings.

Further, in the personal digital assistant 100, when any one of the three types of operating modes is set, the control unit 151 functions as the time difference acquisition unit 151a and the positional information acquisition unit 151b according to the present invention and also functions as a display control unit 151c and an input processing unit 151d.

Operation contents including a specific procedure of acquiring the indicated position information by the control unit 151 when a user uses the pen input function in the personal digital assistant 100 will be described hereinafter.

(Soft Key Mode)

Figure 15:
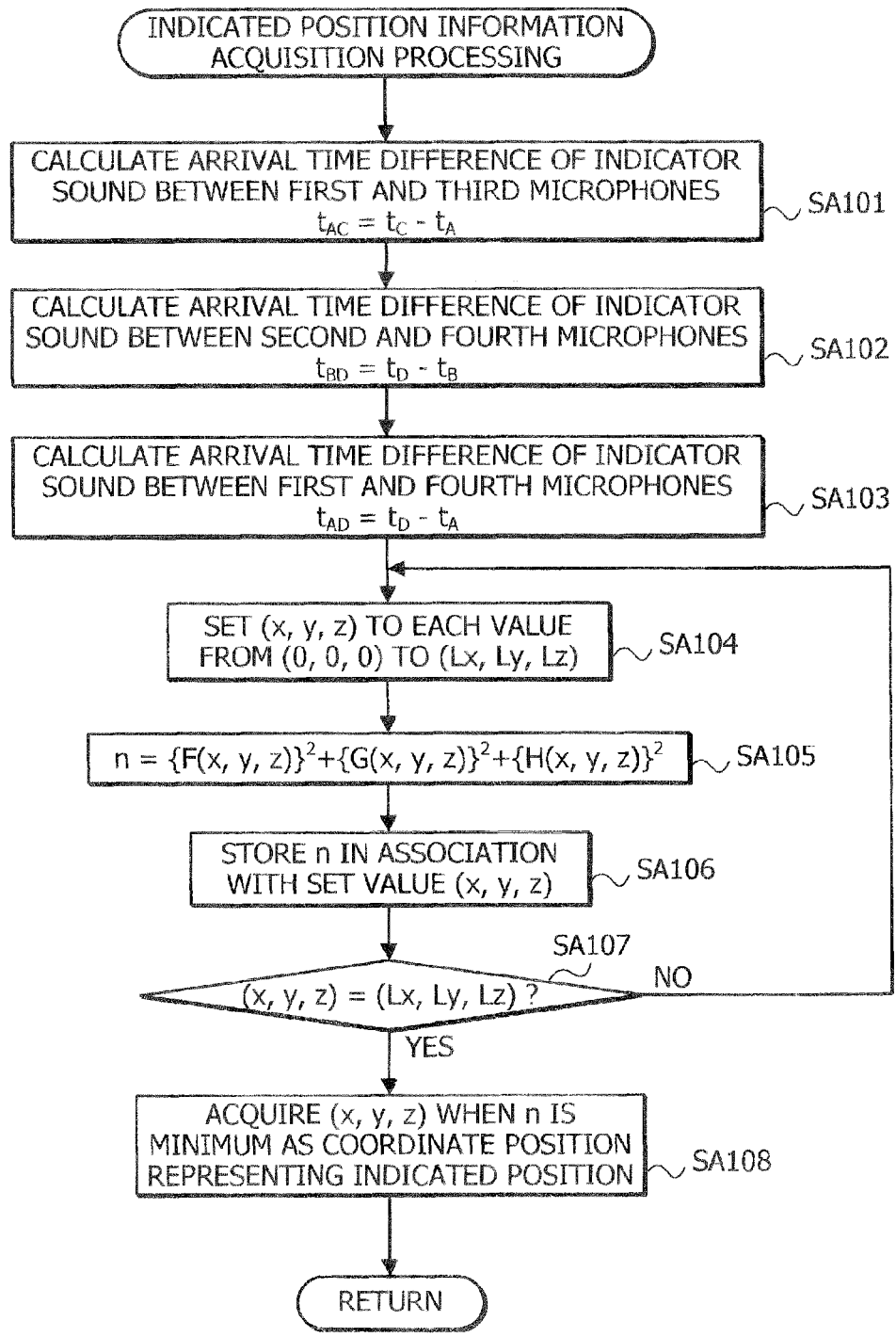
FIG. 15 is a flowchart showing indicated position information acquisition processing.

First, an operation of the personal digital assistant 100 when a user sets the soft key mode will be explained. FIG. 14 and FIG. 15 are flowcharts showing processing contents of the control unit 151, and FIG. 16 is an explanatory view showing an example of operations of the stylus pen 70 when the soft key mode is set and changes in display contents in the display screen 31a of the LCM 31 associated with the operations of the stylus pen 70.

As depicted in FIG. 14, the control unit 151 starts an operation when the soft key mode is set, and it first begins an operation of detecting indicator sound emitted from the stylus pen 70 and also displays a soft key 501 depicted in FIG. 16 in the display screen 31a of the LCM 31 (a step SA1).

Here, the indicator sound detecting operation is an operation of sequentially confirming a change in a sound pressure level of each of output signals from the first to fourth microphones 6A to 6D, and the control unit 151 starts counting an elapsed time which is used for a calculation of an arrival time difference of the indicator sound between each of the pairs of microphones when the indicator sound detecting operation is started.

Further, a soft key 501 is an image constituted of operation buttons, and symbols such as alphabets, a dot, a comma, and others are previously assigned to the respective operation buttons of the soft key 501. In the soft key 501 in an initial state that is displayed at the step SA1, one of the alphabets or symbols assigned to the respective operation buttons is displayed in accordance with each operation button. That is, as depicted in FIG. 16, "A", "F", "K", "P", "U", and "Z" are displayed.

Figure 17A:
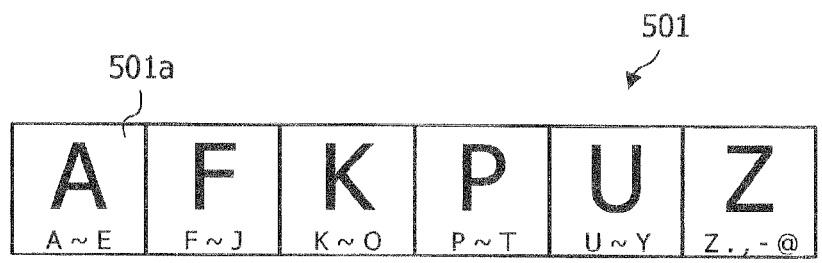
FIG. 17A is an explanatory view showing details of a soft key.

Furthermore, although shown in FIG. 16 in a simplified form, besides the alphabets, guide characters ("A to E", "Z., - @", and others) representing other alphabets or symbols assigned to the respective operation buttons 501a are displayed to be smaller than the above-described alphabets in the respective operation buttons 501a constituting the soft key 501 as depicted in FIG. 17A.

Figure 17B:
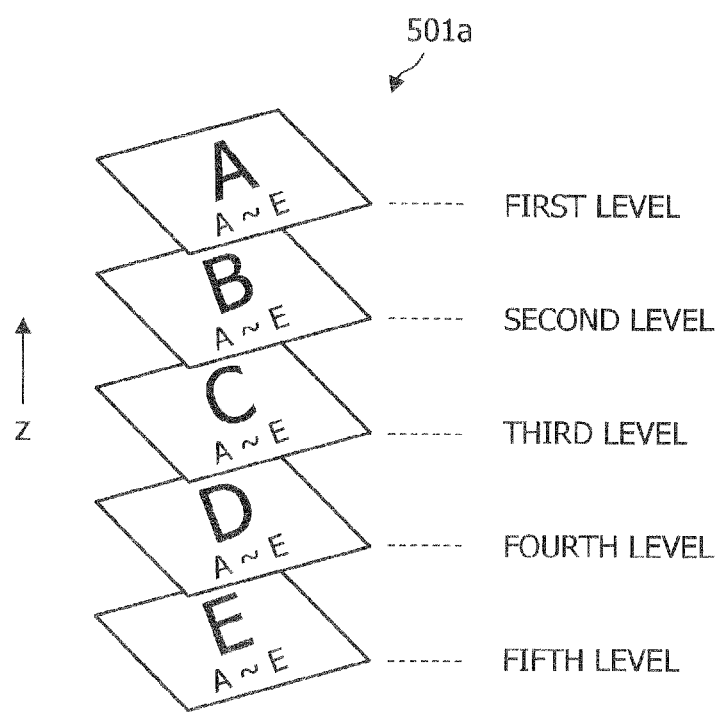
FIG. 17B is an explanatory view showing the details of the soft key.

On the other hand, in each operation button 501a constituting the soft key 501, operating positions on multiple levels are virtually provided in a pressing direction (an opposite direction of the z axis direction), and one of specific alphabets or symbols is assigned to the same operation position on each level. For example, operating positions on five levels are virtually provided to each of the operation buttons 501a. As shown in FIG. 17B, "A" is assigned to the operating position on the first level of the operation button 501a having "A to E" assigned thereto, and "B" to "E" are assigned to the respective operating positions on the second to fifth levels of the same. That is, the control unit 151 displays in each operation button 501a of the soft key 501 in the initial state an alphabet or a symbol assigned to the operating position on the first level of each operation button 501a.

In the following description, alphabets or symbols assigned to the positions on the respective levels of each operation button 501a will be referred to as characters or the like.

After executing the processing at the step SA1, the control unit 151 sequentially confirms whether the indicator sound of the stylus pen 70 was detected (a step SA2). That is, the control unit 151 sequentially confirms whether a peak appeared in a sound pressure level of the output signal from each of the first to fourth microphones 6A to 6D with a small time difference.

Moreover, when the control unit 151 can successfully confirm that the peak appeared in the sound pressure level of each of the output signals from the first to fourth microphones 6A to 6D with a small time difference (the step SA2: YES), it determines that the indicator sound was detected at this point in time and acquires indicated position information representing the indicated position as an indicator sound generation source, i.e., a coordinate position (x, y, z) in the Cartesian coordinates shown in FIG. 12A based on the above-described method (a step SA3).

FIG. 15 is a flowchart showing a procedure of acquiring the indicated position information in the control unit 151. When acquiring the indicated position information, the control unit 151 determines the time point at which the peak appeared in the sound pressure level of each of the output signals from the first to fourth microphones 6A to 6D as a time point at which the indicator sound arrived each microphone.

Additionally, the control unit 151 subtracts an elapsed time ($t_A$) at a time point where the indicator sound arrived the first microphone 6A from an elapsed time ($t_C$) at a time point where the indicator sound arrived the third microphone 6C, thereby acquiring an arrival time difference $t_{AC}$ of the indicator sound between the first and third microphones 6A and 6C (a step SA101).

Further, the control unit 151 subtracts an elapsed time ($t_B$) at a time point where the indicator sound arrived the second microphone 6B from an elapsed time ($t_D$) at a time point where the indicator sound arrived the fourth microphone 6D, thereby acquiring an arrival time difference $t_{BD}$ of the indicator sound between the second and fourth microphones 6B and 6D (a step SA102).

Furthermore, the control unit 151 subtracts an elapsed time ($t_A$) at a time point where the indicator sound arrived the first microphone 6A from an elapsed time ($t_D$) at a time point where the indicator sound arrived the fourth microphone 6D, thereby acquiring an arrival time difference $t_{AD}$ of the indicator sound between the first and fourth microphones 6A and 6D (a step SA103).

Subsequently, the control unit 151 executes processing of sequentially setting coordinate positions from (0, 0, 0) to ($L_x$, $L_y$, $L_z$) as the coordinate position (x, y, z) at an arbitrary point in the Cartesian coordinates depicted in FIG. 12A (a step SA104). The control unit 151 assigns the set coordinate position (x, y, z) and the arrival time difference ($t_{AC}$, $t_{BD}$, or $t_{AD}$) of each pair of microphones acquired at the step SA101 to the step SA103 to Equation (12) as the discriminant to obtain each calculation result (n) (a step SA105). The control unit 151 stores each obtained calculation result (n) in an internal memory in association with the set coordinate position (x, y, z) (a step SA106) Thereafter, the control unit 151 repeats the processing of the step SA104 to the step SA106 until the coordinate position (x, y, z) changes to ($L_x$, $L_y$, $L_z$) (a step SA107: NO).

Furthermore, the control unit 151 stores the calculation result (n) when ($L_x$, $L_y$, $L_z$) is assigned to the coordinate position (x, y, z) (the step SA107: YES), then confirms the coordinate position (x, y, z) when the calculation result (n) having a minimum value in all the stored calculation results (n) is obtained, and acquires the confirmed coordinate position (x, y, z) as a coordinate position representing the indicated position, i.e., the indicated position information (a step SA108).

It is to be noted that a specific processing procedure for obtaining the coordinate position (x, y, z) at which the calculation result (n) of Equation (12) has the minimum value is arbitrary.

On the other hand, after acquiring the coordinate position (x, y, z) as the indicated position information, the control unit 151 returns to the processing depicted in FIG. 14 and confirms whether the indicated position (x, y) in the display screen 31a associated with the acquired coordinate position (x, y, z) is present within a button region (a step SA4). That is, the control unit 151 confirms whether the coordinate position (x, y) on the XY plane represented by the acquired coordinate position (x, y, z) is included in a display region of any operation button 501a constituting the soft key 501.

Furthermore, if the indicated position (x, y) in the display screen 31a is not present in the button region (the step SA4: NO), the control unit 151 returns to the processing of the step SA2 without executing any processing. Moreover, if the indicated position (x, y) in the displays screen 31a is present in the button region (the step SA4: YES), the control unit 51 further confirms whether an operation button associated with the indicated position (x, Y) is an already selected operation button (a step SA5).

At the beginning of the processing, even if the indicated position (x, y) in the display screen 31a is present in the button region, an operation button associated with the indicated position (x, y) is not a selected button (the step SA5: NO). Therefore, the control unit 151 first highlights a displayed character or the like (a character or a symbol at the operating position on the first level) in an operation button at a position associated with the indicated position (x, y), determines this operation button as a selected button, and stores predetermined button identifying information representing this operation button in the internal memory (a step SA6). Moreover, the control unit 151 stores a z coordinate of the coordinate position (x, y, z) acquired at the step SA3 in the internal memory as a reference position in the z axis direction (a height direction) (a step SA7) and then immediately returns to the processing of the step SA2.

Therefore, when the user moves the end portion of the stylus pen 70 to the upper side of the operation button "A to E" with, e.g., a push switch 72 being pushed, the operation button "A to E" is stored as a selected operation button, and the character "A" on the first level is highlighted as shown in State I in FIG. 16. At the same time, a position of the end portion of the stylus pen 70 in the vertical direction is stored.

Subsequently, the control unit 151 acquires a new coordinate position (x, y, z) (the step SA) every time indicator sound is detected (the step SA2: YES). Additionally, at the time of acquisition of the new coordinate position (x, y, z) at the step SA3, if an indicated position (x, y) in the display screen 31a is present in the button region (the step SA4: YES) but an operation button associated with the indicated position (x, y) is not a selected operation button, i.e., if the operation button associated with the indicated position (x, y) is changed to another operation button (the step SA5: NO), the processing of the steps SA6 and SA7 is again executed.

That is, the control unit 151 highlights a character or the like displayed in an operation button at a position corresponding to the new indicated position (x, y), determines this operation button as a selected operation button, and stores in the internal memory predetermined button identifying information representing this operation button (the step SA6).

Additionally, the control unit 151 stores a z coordinate of the newly acquired coordinate position (x, y, z) in the internal memory as a reference position in the z axis direction (the step SA7).

Therefore, when the user moves the end portion of the stylus pen 70 to the upper side of the operation button having "K to O" assigned thereto from the operation button having "A to E" assigned thereto while pushing the push switch 72, the operation button having "K to O" assigned thereto is stored as the selected operation button, and the character "K" on the first level is highlighted as shown in State II in FIG. 16. At the same time, a position of the end portion of the stylus pen 70 in the vertical direction is stored.

Further, at the time of acquisition of the new coordinate position (x, y, z) at the step SA3, if the indicated position (x, y) in the display screen 31a is present in the button region (the step SA4: YES) and the operation button associated with the indicated position (x, y) is the selected operation button (the step SA5: YES), whether the z coordinate has been changed is confirmed (a step SA8).

If the z coordinate has no change (the step SA8: NO), the control unit 151 immediately returns to the processing of the step SA2. Further, if the z coordinate has been changed (the step SA8: YES), the control unit 151 subtracts a value of a new z coordinate from a value of the z coordinate stored as the reference position to calculate a movement in a downward direction from the reference position stored at the step SA7 at the indicated position (an indicator sound emitted position) (a step SA9). IL is to be noted that, if the movement has a negative value in the processing of the step SA9, the control unit 151 determines the movement as 0.

Then, the control unit 51 confirms whether the highlighted character or the like is a character or the like at an operating position (a level position) previously determined in accordance with the movement calculated at the step SA9 (a step SA10). It is to be noted that the movement and the level position have a relationship that the operating position increases level by level every time the movement increases by a fixed value.

Furthermore, if the highlighted character or the like is a character or the like at a level position associated with the calculated movement (the step SA10: YES), the control unit 151 returns to the processing of the step SA2 without executing anything. Contrary, if the highlighted character is not a character or the like at an operating position associated with the calculated movement (the step SA10: NO), the control unit 151 changes the highlighted character or the like to the character or the like at the operating position associated with the movement (a step SA11) and then temporarily returns to the processing of the step SA2.

Therefore, the users moves the end portion of the stylus pen 70 to, e.g., the upper side of the operation button to which "K to O" is assigned while pushing the push switch 72 and subsequently moves the end portion of the stylus pen 70 to the display screen 31a side (the lower side) for a predetermined amount. Then, as shown in State III in FIG. 16, the highlighted character is changed from "K" to "N", for example.

On the other hand, when no indicator sound is produced while repeating the processing at the step SA2 and subsequent steps (the step SA2: NO) and a state where no indicator sound is detected continues for a predetermined time or more, i.e., for a predetermined time longer than an indicator sound emission interval of the stylus pen 70 or more (a step SA12: YES), the control unit 151 executes the following processing.

First, the control unit 151 confirms whether a previous indicated position (x, y) in the display screen 31a is present in the button region (a step SA13). Further, if the previous indicated position (x, y) is present in the button region (the step SA13: YES), the control unit 151 displays a displayed character or the like with respect to a selected operation button in a predetermined character input region in the display screen 31a (a step SA14). That is, the control unit 151 executes textual information input processing.

Therefore, for example, when the user stops an operation of pushing the push switch 72 to halt generation of indicator sound in State III in FIG. 16, the character "N" is input to the predetermined character input region in the display screen 31a as shown in State IV in FIG. 16.

Furthermore, if the previous indicated position (x, y) is not present in the button region (the step SA13: NO) at the time of the processing at the step SA13, the control unit 151 initializes the soft key 501, i.e., resets the same initial state as that at the time of displaying the soft key 501 at the step SA1 (a step SA) and then returns to the processing of the step SA2.

Thereafter, the control unit 151 repeatedly executes the processing at the step SA2 and subsequent steps until the user releases the soft key mode.

As described above, when the soft key mode is set in the personal digital assistant 100 at the time of using the pen input function, the user can input a desired character or the like by utilizing the stylus pen 70.

(Brush Style Mode)

Figure 18:
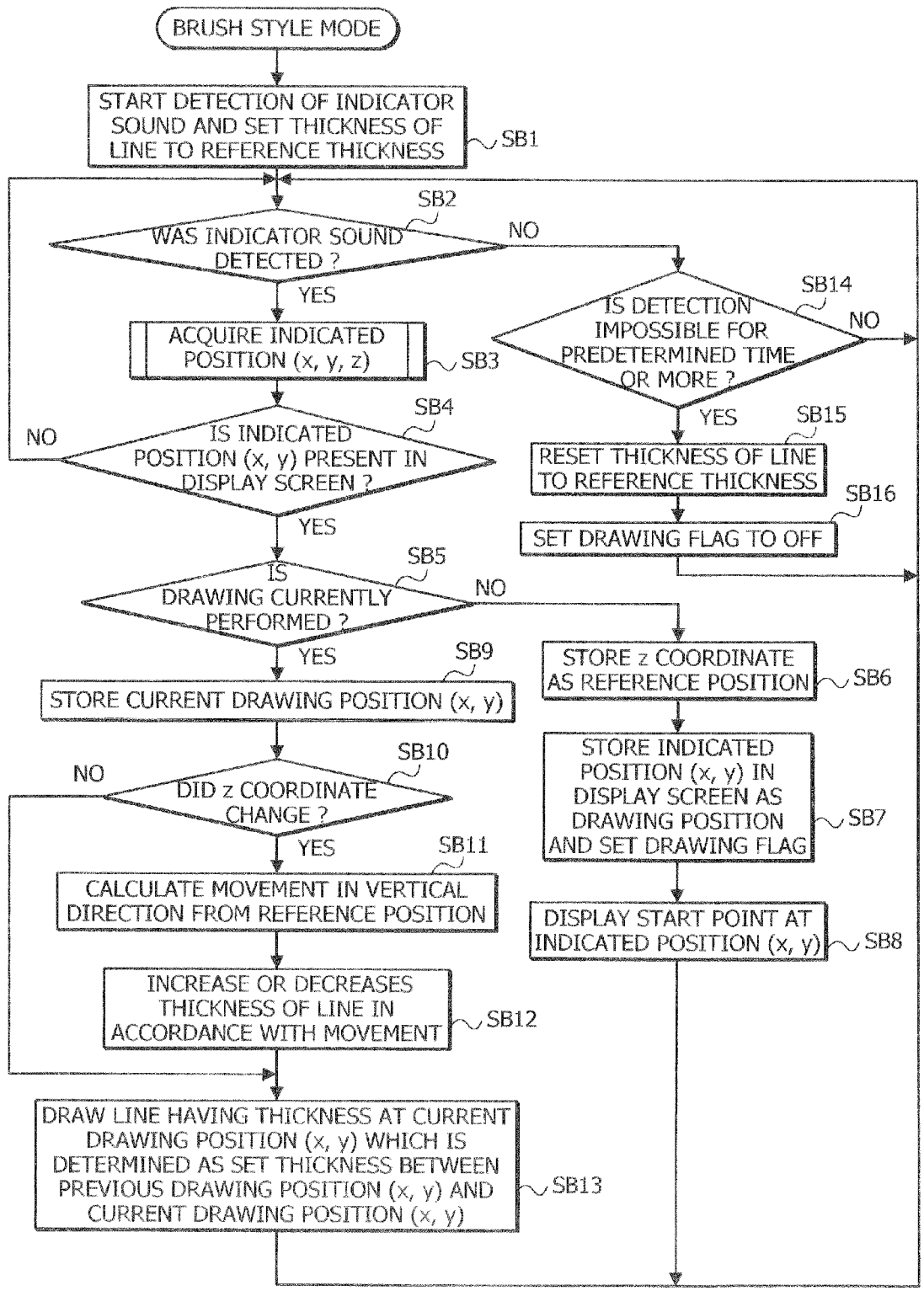
FIG. 18 is a flowchart showing processing contents in a brush style mode.
Figure 19:
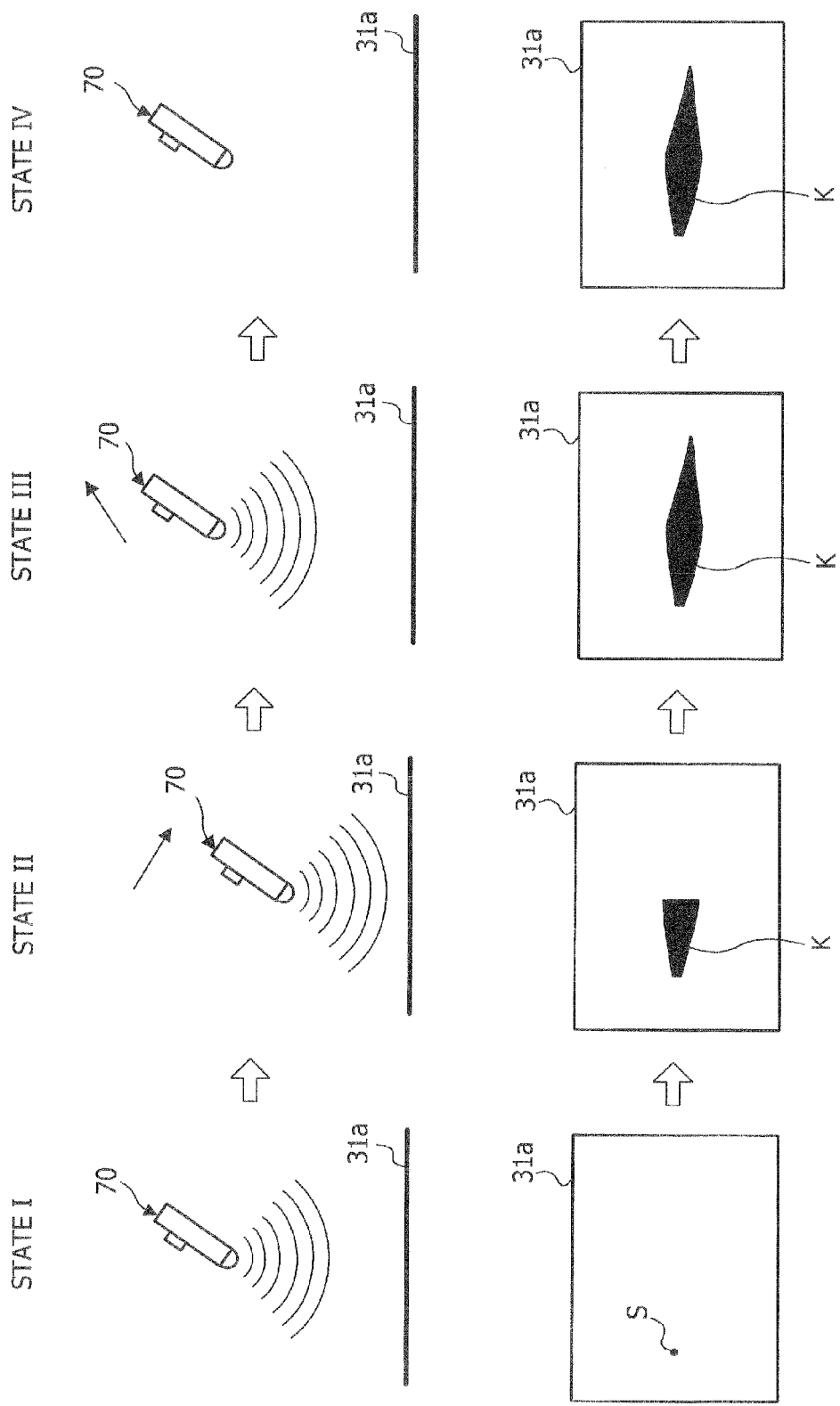
FIG. 19 is an explanatory showing an example of an operation of the personal digital assistant in the brush style mode.

An operation of the personal digital assistant 100 when the brush style mode is set by a user will now be described. FIG. 18 is a flowchart showing processing contents of the control unit 151, and FIG. 19 is an explanatory view showing an example of operations of the stylus pen 70 when the brush style mode is set and changes in display contents in the display screen 31a of the LCM 31 associated with the operations of the stylus pen 70.

As shown in FIG. 18, the control unit 151 starts an operation when the brush style mode is set, first starts an operation of detecting indicator sound generated by the stylus pen 70, and sets a thickness of a line to be drawn (a line width) to a previously determined reference thickness (a step SB1). It is to be noted that the indicator sound detecting operation is the same as that in the soft key mode, and the control unit 151 starts counting an elapsed time that is used for calculating an arrival time difference of the indicator sound between each of the pairs of microphones at the time of starting the indicator sound detecting operation.

After executing the processing at the step SB1, control unit 151 sequentially confirms whether the indicator sound of the stylus pen 70 was successfully detected (a step SB2). That is, the control unit 151 sequentially confirms whether a peak appeared in a sound pressure level of an output signal from each of the first to fourth microphones 6A to 6D with a small time difference.

Furthermore, when the control unit 151 can confirm that the peak appeared in the sound pressure level of the output signal from each of the first to fourth microphones 6A to 6D with the small time difference, it determines that the indicator sound was successfully detected at this point in time (the step SB2: YES) and acquires indicated position information representing an indicated position which is an indicator sound generation source, i.e., a coordinate position (x, y, z) in the Cartesian coordinates depicted in FIG. 12 by the above-described processing shown in FIG. 15 (a step SB3).

Subsequently, the control unit 151 confirms whether a coordinate position (x, y) on the XY plane represented by the acquired coordinate position (x, y, z) is a position in the display screen 31a (a step SB4)

If the indicated position (x, y) is not present in the display screen 31a (the step SB4: NO), the control unit 151 returns to the processing of the step SB2 without executing anything. Moreover, if the indicated position (x, y) is present in the display screen 31a (the STEP SB4: YES), the control unit 151 further confirms whether drawing is being performed (a step SB5). It is to be noted that the confirmation at the step SB5 is performed by confirming whether a later-described drawing flag is stored in the internal memory.

At the beginning of the processing, even if the indicated position (x, y) is present in the display screen 31a, the drawing is not being performed (the step SB5: NO). Therefore, the control unit 151 first stores a z coordinate of the coordinate position (x, y, z) acquired at the step SB3 in the internal memory as a reference position in a z axis direction (a height position) (a step SB6).

Additionally, the control unit 151 also stores the indicated position (x, y) in the display screen 31a in the internal memory as a drawing posit ion and sets a drawing flag representing that the drawing is being effected (a step SB7). It is to be noted that setting the drawing flag is processing of storing the drawing flag in the internal memory. Thereafter, the control unit 151 displays a start point at the indicated position (x, y) in the display screen 31a (a step SB8) and temporarily returns to the processing of the step SB2.

That is, when a user pushes the push switch 72 in a state where the end portion of the stylus pen 70 is placed above a desired position in the display screen 31a, a start point S is displayed at the desired position in the display screen 31a as shown in State I in FIG. 19. At the same time, the indicated position (x, y) in the display screen 31a and a position of the end portion of the stylus pen 70 in the vertical direction are stored.

Subsequently, the control unit 151 acquires a new coordinate position (x, y, z) (the step SB3) every time the indicator sound is detected (the step SB2: YES) Further, at the time of acquisition of the new coordinate position (x, y, z) at the step SB3, if a coordinate position (x, y) on the XY plane is a position in the display screen 31a (the step SB4: YES) and the drawing is being effected (she step SB5: YES), the control unit 151 stores the new coordinate position (x, y) on the NY plane in the internal memory as a current drawing position (a step SB9).

Then, the control unit 151 executes the following processing. First, the control unit 151 confirms whether the z coordinate has been changed (a step SB10) Furthermore, if the z coordinate has no change (the step SB10: NO), the control unit 151 immediately draws a line having a thickness at the current drawing position (x, y) which is determined as a set thickness between a previous drawing position (x, y) and the current drawing position (x, y) (a step SB13).

On the other hand, if the z coordinate has been changed (the step SB10: YES), the control unit 151 subtracts a value of the new z coordinate from a value of the z coordinate stored as a reference position to calculate a movement at the indicated position (an indicator sound emitted position) in the vertical direction from the reference position stored at the step SB6 (a step SB11). That is, the control unit 151 acquires a positive or negative value as the movement.

Subsequently, the control unit 151 increases or decreases a thickness of a line which should be drawn in accordance with a calculated movement (a step SB12). In the processing at the step SB12, if the calculated movement has a positive value and the indicated position has moved downward from the reference position, the control unit 151 configures a setting of increasing the thickness of the line which should be draw to be larger than a reference thickness by an amount associated with the movement. Furthermore, in the processing at the step SB12, if the calculated movement has a negative value and the indicated position has moved upward from the reference position, the control unit 151 configures a setting of reducing the thickness of the line which should be drawn to be smaller than the reference thickness by an amount associated with the movement.

Thereafter, the control unit 151 draws the line having the thickness at the current drawing position (x, y) which is determined as the set thickness between the previous drawing position (x, y) and the current drawing position (x, y) in the display screen 31a (the step SB13). Then, the control unit 151 temporarily returns to the processing of the step SB2 and repeatedly executes the processing of the step SB9 to the step SB13 every time the indicator sound is detected while the detection of the indicator sound is possible.

Therefore, after the start point S is displayed in the display screen 31a as shown in State I in FIG. 19, for example, when a user moves (the end portion of) the stylus pen 70 toward an obliquely lower right side while pushing the push switch 72, a line K which gradually thickens is drawn from the start point S toward the right-hand side in toe display screen 31a as shown in State II in FIG. 19. Moreover, when the user moves the stylus pen 70 toward an obliquely upper right side, the line K which is being drawn extends toward the right-hand side while gradually thinning as shown in State III in FIG. 19. That is, line drawing information input processing is executed.

On the other hand, if the indicator sound cannot be detected (the step SB2: NO) which repeating the processing of the step SB2 and subsequent steps and a state where the indicator sound cannot be detected continues for a predetermined time or more, i.e., a predetermined time longer than an indicator sound emission interval of the stylus pen 70 or more (the step SB14: YES), the control unit 151 executes the following processing.

That is, the control unit 151 resets the thickness of the line to be drawn to the reference thickness (a step SB15) and sets the drawing flag so an OFF state (a step SB16). The processing of setting the drawing flag to the OFF state is processing of erasing the drawing flag from the internal memory. Thereafter, the control unit 151 returns to the processing of the step SB2 and repeatedly executes the processing at the step SB2 and subsequent steps until the user releases the brush style mode.

Therefore, when the user has drawn a desired line, he/she temporarily stops pushing the push switch 72 to halt generation of the indicator sound and then again pushes the push switch 72, thereby starting drawing of a new line.

Based on the above-described operations, when the brush style mode is set in the personal digital assistant 100 at the time of use of the pen input function, the user can draw a desired line by moving the stylus pen 70 in vertical and horizontal directions with respect to the displays screen 31a. At the same time, the user can change a thickness of the line by moving up and down the stylus pen 70 during drawing of the line. That is, the user can draw a line or a character having a desired shape in the display screen 31 while freely adjusting a thickness of the line just like writing a line or a character with a writing brush.

(Line Drawing Mode)

Figure 20:
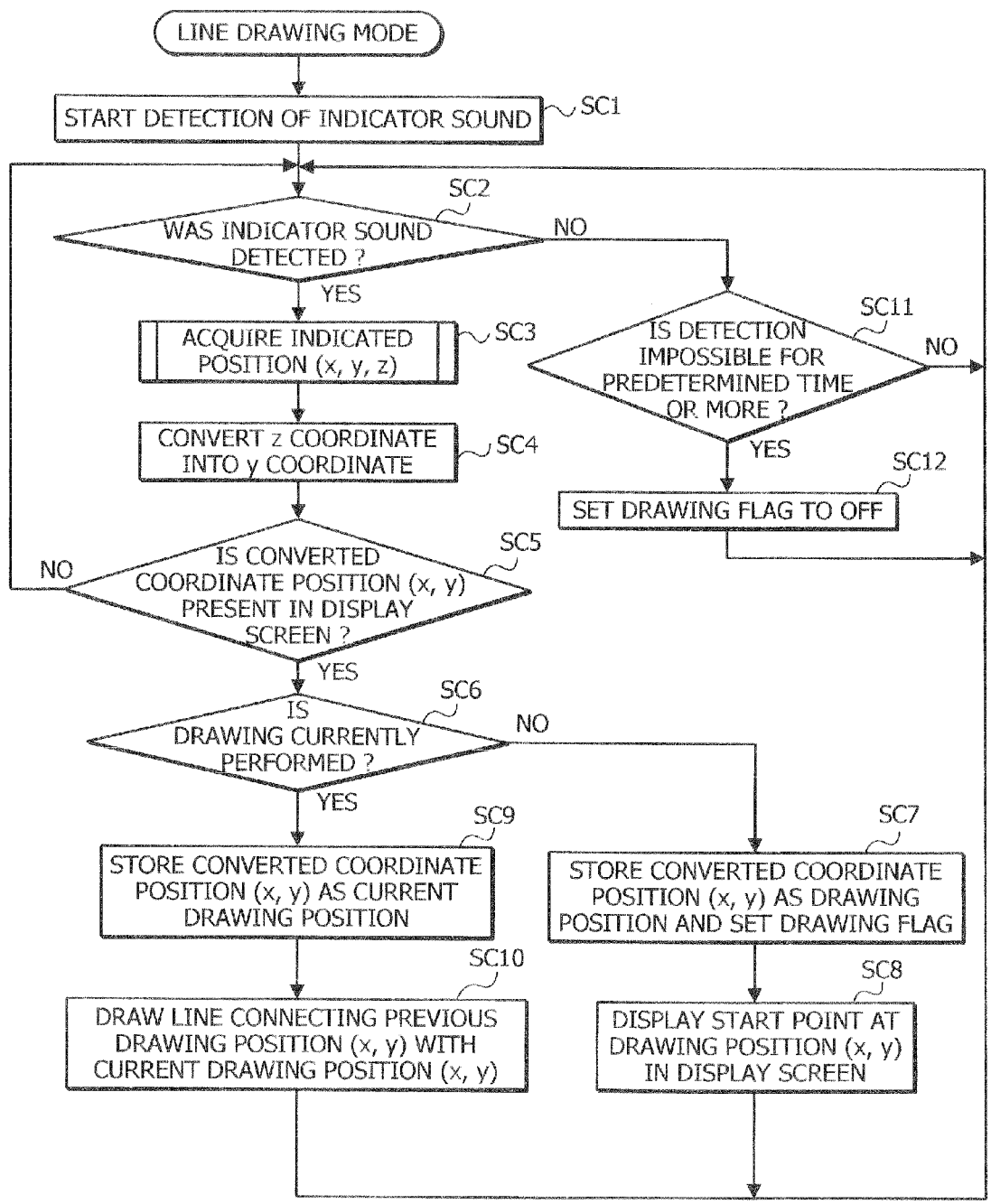
FIG. 20 is a flowchart showing processing contents in a line drawing mode.
Figure 21:
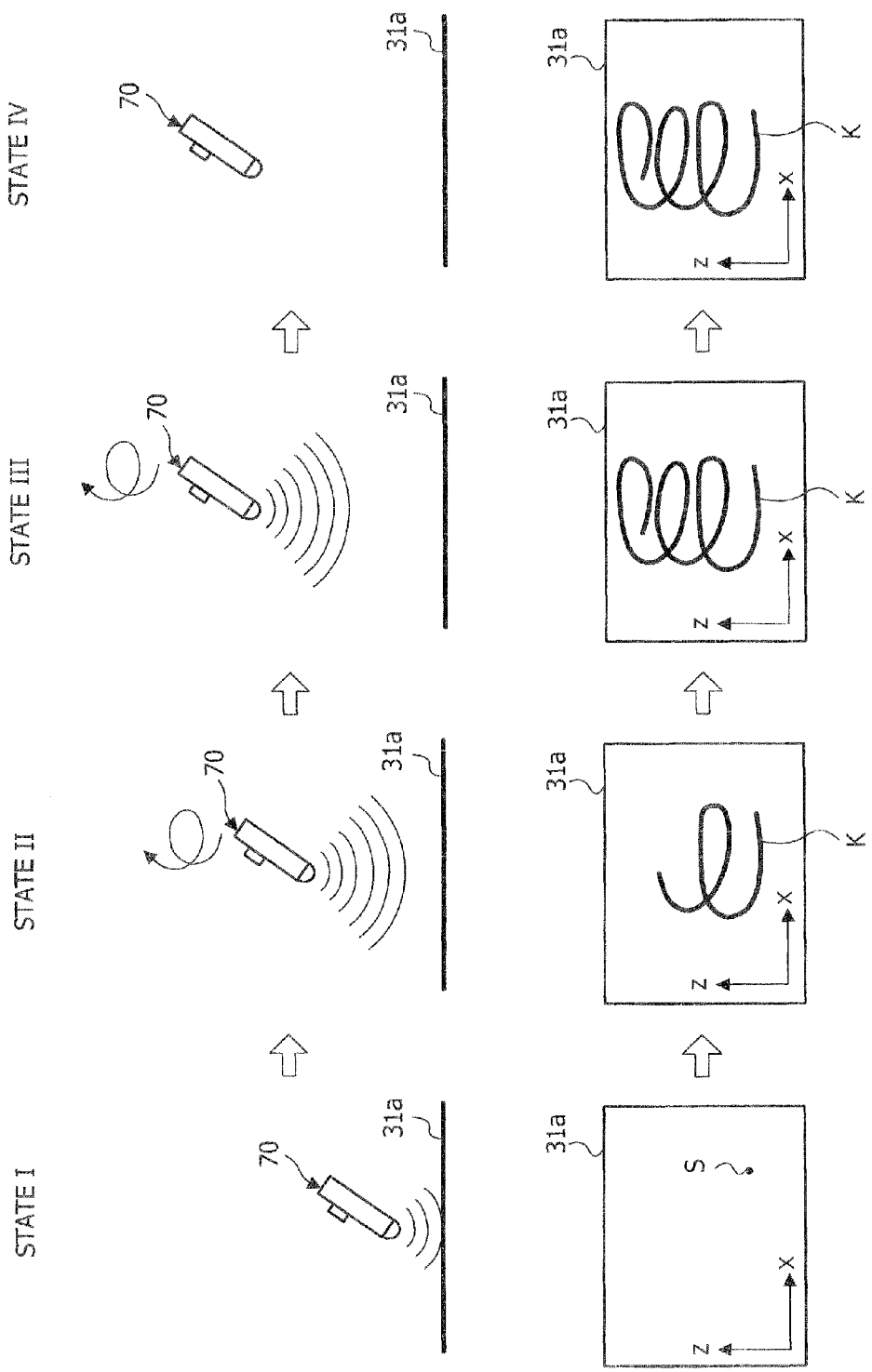
FIG. 21 is an explanatory view showing an example of an operation of the personal digital assistant in the line drawing mode.

An operation of the personal digital assistant 100 when the line drawing mode is set by a user will now be described. FIG. 20 is a flowchart showing processing contents of the control unit 151, and FIG. 21 is an explanatory view showing an example of operations of the stylus pen 70 with the line drawing mode being set and changes in display contents in the display screen 31a of the LCM 31 associated with the operations of the stylus pen 70.

As shown in FIG. 20, the control unit 151 starts an operation when the line drawing mode is set, first starts an operation of detecting indicator sound generated by the stylus pen 70, and sets a thickness of a line to be drawn to a previously determined reference thickness (a step SC1). It is to be noted that the indicator sound detecting operation is the same as those in the soft key mode and the brush style mode, and the control unit 151 starts counting an elapsed time used for a calculation of an arrival time difference of the indicator sound between each of the pairs of microphones at the time of starting the indicator sound detecting operation.

After executing the processing at the step SC1, the control unit 151 sequentially confirms whether the indicator sound of the stylus pen 70 was detected (a step SC2). That is, the control unit 151 sequentially confirms whether a peak appeared in a sound pressure level of an output signal from each of the first to fourth microphones with a small time difference.

Furthermore, when the control unit 151 can confirm that the peak appeared in the sound pressure level of the output signal from each of the first to fourth microphones 6A to 6D with a small time difference, it determines that the indicator sound was successfully detected at this point in time (the step SC2: YES) and acquires indicated position information representing an indicated position which is an indicator sound emitted position, i.e., a coordinate position (x, y, 7) in the Cartesian coordinates shown in FIG. 12A by the above-described processing shown in FIG. 15 (a step SC3).

Subsequently, the control unit 151 converts a z coordinate in the acquired coordinate position (x, y, z) into a y coordinate (a step SC4) and then confirms whether the converted coordinate position (x, y) is a position in the display screen 31a (a step SC5).

If the converted coordinate position (x, y) is not present in the display screen 31a (the step SC5: NO), the control unit 151 returns to the processing at the step SC2 without executing anything. Moreover, if the converted coordinate position (x, y) is present in the display screen 31a (the step SC5: YES), the control unit 151 further confirms whether drawing is being performed (a step SC6). It is to be noted that the confirmation at the step SC6 is performed by confirming whether a later-explained drawing flag is stored in the internal memory.

At the beginning of the processing, even if the converted coordinate position (x, y) is present in the display screen 31a, the drawing is not being performed (the step SC6: NO). Therefore, the control unit 151 first stores the converted coordinate position (x, y) as a drawing position in the internal memory and sets a drawing flag indicating that the drawing is being effected (a step SC7). It is to be noted that setting the drawing flag is processing of storing the dr awing flag in the internal memory. Thereafter, the control unit 151 displays a start point at the drawing position (x, y) in the display screen 31a (a step SC8) and temporarily returns to the processing of the step SC2.

That is, when the user pushes the push switch 72 in a state where the end portion of the stylus pen 70 is placed on the upper side of a desired position in the displays screen 31a, a start point S is displayed in the display screen 31a as shown in State I in FIG. 21. At the same time, the drawing position (x, y) in the display screen 31a is stored. However, as different from the above-described brush style mode, since the vertical direction (a y axis direction) of the display screen 31a is an up-and-down direction (the z axis direction) in a three-dimensional space, a display position of the start point S is a position that is in contact with a lower edge of the display screen 31a when the end portion of the stylus pen 70 is in contact with the display screen 31a.

Subsequently, the control unit 151 acquires a new coordinate position (x, y, z) (the step SC3 every time the indicator sound is detected (the step SC2: YES), and it converts a z coordinate in the acquired coordinate position (x, y, z) into a y coordinate (the step SC4).

Further, if the converted coordinate position (x, y) is a position in the display screen 31e (the step SC5: YES) and the drawing is being effected (the step SC6: YES), the control unit 151 stores the newly acquired converted coordinate position (x, y) in the internal memory as a current drawing position (a step SC9). Then, the control unit 151 draws a line that connects the previous drawing position (x, y) with the current drawing position (x, y) in the display screen 31a (a step SC10).

Thereafter, the control unit 151 temporarily returns to the processing of the step SC2 and repeatedly executes the processing of the step SC4 to the step SC6, the step SC9, and the step SC10 every time the indicator sound is detected while the indicator sound can be detected.

Therefore, after the start point S is displayed in the display screen 31a as shown in State I in FIG. 21, for example, when the user moves (the end portion of) the stylus pen 70 to draw a spiral in a direction away from the display screen 31a (toward the upper side) while pushing the push switch 72, a line K is drawn in the display screen 31a as shown in State II in FIG. 21 and State III in FIG. 21 in the mentioned order. That is the line drawing information input processing is performed.

That is, in the display screen 31a is drawn the line K which indicates a locus of the end portion of the stylus pen 70 in a state where observation is carried out with a line of vision being parallel to the display screen 31a and coinciding with the vertical direction (the y axis direction) or the display screen 31a, i.e., a state where observation is carried out from a specific direction.

On the other hand, when the indicator sound is not generated (the step SC2: NO) while repeating the processing of the stop SC2 and subsequent steps and a state where the indicator sound cannot be detected continues for a predetermined time or more, i.e., this state continues for a predetermined time longer than an indicator sound emission interval of the stylus pen 70 or more (the step SC11: YES), the control unit 151 sets the drawing flag to an OFF state (a step SB16). The processing of setting the drawing flag to the OFF state is processing of erasing the drawing flag from the internal memory. Thereafter, the control unit 151 returns to the processing of the step SC2 and repeatedly executes the processing of the step SC2 and subsequent steps until the user releases the line drawing mode.

Therefore, after a desired line is drawn, the user temporarily stops the operation of pushing the push switch 72 to halt generation of the indicator sound and then again pushes the push switch 72, thereby starting drawing a new line.

When the line drawing mode is set in the personal digital assistant 100 at the time of use of the pen input function based on the above-described operations, the user can cope with a movement locus of the end portion of the stylus pen 70 in the three-dimensional space and make a line drawing representing a shape obtained when observing the movement locus from a specific direction by moving the stylus pen 70 above the display screen 31a.

That is, the indicated position detecting apparatus according to the third embodiment includes a display module having a display screen; a plurality of microphones which are arranged at an outer peripheral portion of the display screen to be apart from each other and detect indicator sound emitted from a three-dimensional space above the display screen; a time difference acquisition unit which acquires arrival time differences of the contact sound between two microphones in each of three combinations of the plurality of microphones; and a positional information acquisition unit which derives three hyperboloids corresponding to the arrival time differences acquired by the time difference acquisition unit, each hyperboloid having focal points at the two microphones in each of the three combinations of the plurality of microphones, and acquires an intersection of the three derived hyperboloids as information of a position where the indicator sound is emitted.

Further, in the personal digital assistant 100 including the indicated position detecting apparatus according to the third embodiment, when the user utilizes the pen input function, the indicator sound generated by the stylus pen 70 is detected by the first to fourth microphones 6A to 6D, and the coordinate position (x, y, z) indicative of a position of the end portion of the stylus pen 70 which is an indicator sound emitted position is acquired as indicated position information representing the indicated position with respect to the display screen 31a based on arrival time differences of the indicator sound in the respective pairs of microphones.

Therefore, the display screen 31a does not have to be covered with any other member as different from an example where a resistive touch panel is utilized no detect an indicated position with respect to the display screen 31a. Therefore, the indicated position in the display screen 31a can be detected without deteriorating the display characteristics of the LCM 1.

Further, in the personal digital assistant 100, to acquire three-dimensional positional information (x, y, z) as the indicated position information, characters and the like can be assigned to each of the operation buttons in the soft key 501 displayed in the display screen 31a in the soft key mode. That is, as compared with an example where characters and others can be input based on selection of each button in the screen by using a general software keyboard, the number of operation buttons displayed in the display screen 31a can be reduced. Therefore, when a display area of the soft key 501 is reduced, the display screen 31a can be effectively used at the time of using the pen input function to enable input of characters and the like.

Furthermore, in the brush style mode, as described above, when a thickness of a line which is being drawn in the display screen 31a is sequentially changed in accordance with upward and downward movements of the stylus pen 70, the user can freely adjust the thickness of the line just like drawing a line or a character with a writing brush.

Moreover, in the line drawing mode, as described above, it is possible to cope with a movement locus of the end portion of the stylus pen 70 in the three-dimensional space and make a line drawing representing a shape obtained when observing the movement locus from a specific direction. Additionally, when the user sequentially confirms a line drawing (the movement locus) provided at an observing point different from an actual observing point during an operation of making the line drawing, he/she can relatively easily make a line drawing which represents a slightly complicated three-dimensional shape.

It is to be noted that the configuration and others of the personal digital assistant 100 described in this embodiment can be changed as follows when carrying out the present invention.

For example, the two straight lines LL and MM on which two pairs of microphones in the first to fourth microphones 6A to 6D are arranged, respectively and which are orthogonal to each other do not have to be necessary present on the same plane. The two straight lines LL and MM may be present on different planes which are parallel to each other. Further, the two straight lines LL and MM may be present on different planes which are not parallel to each other.

Furthermore, the two straight lines LL and MM which are orthogonal to each other like this embodiment are convenient for the calculation of a coordinate position (x, y, z) indicative of an arbitrary indicated position P with respect to the display screen 31*a*. However, the two straight lines LL and MM may simply cross each other in the display screen 31*a* when they are projected onto the display screen 31*a*.

Figure 22:
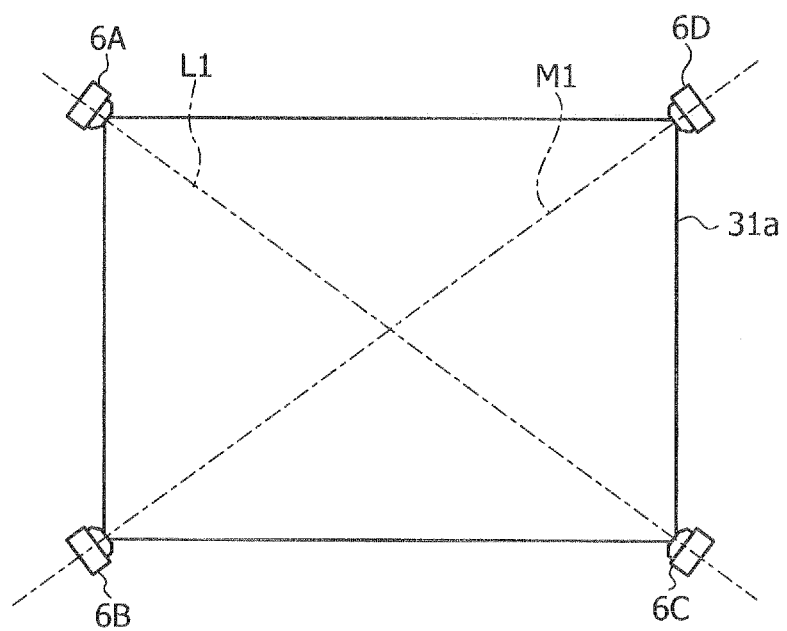
FIG. 22 is an arrangement plan showing another arrangement example of microphones in the third embodiment.

Moreover, as shown in FIG. 22, the first to fourth microphones 6A to 6D may be arranged at respective corner portions of the display screen 31*a*. That is, the first to fourth microphones 6A to 6D may be arranged to form pairs on a straight line L1 including one diagonal line of the display screen 31*a* and a straight line M1 including the other diagonal line.

Additionally, installing positions of the first to fourth microphones 6A to 6D in the LCM 1 can be appropriately changed as long as indicator sound emitted from the stylus pen 70 can be detected above the display screen 31*a* when a user indicates an arbitrary position with respect to the display screen 31*e*. That is, it is good enough for the first to fourth microphones 6A to 6D to be apart from each other, and these microphones can be arranged at arbitrary positions at the outer peripheral portion of the display screen 31*a*.

Further, in this embodiment, the first to fourth microphones 6A to 6D are provided at the outer peripheral portion of the display screen 31*a*, one pair in three pairs of microphones is determined as microphones on one side in each of the two remaining pairs of microphones. That is, the first and fourth microphones 6A and 6D are determined as one pair of microphones.

However, for example, when a fifth microphone and a sixth microphone are provided at the outer peripheral portion of the display screen 31*a* in addition to the first to fourth microphones 6A to 6D, microphones in each of the three pairs of microphones may consist of two microphones which do not configure the other pairs of microphones.

Furthermore, for example, when the fifth microphone alone is provided at the outer peripheral portion of the display screen 31*a* in addition to the first to fourth microphones 6A to 6D, any one of the five microphones alone may be used as a microphone which configures two different pairs of microphones.

Moreover, the first to third microphones 6A to 6C alone may be provided at the outer peripheral portion of the display screen 31*a*, and the respective three microphones may be used as microphones which configure one pair and the other pair in two different pairs of microphones. That is, the first and second microphones 6A and 6B may be used as a first pair, the second and third microphones 6B and 6C may be used as a second pair, and the third and first microphones 6C and 6A may be used as a three pair.

Additionally, not only in a situation where the four microphones, i.e., the first to fourth microphones 6A to 6D are provided at the outer peripheral portion of the display screen 31*a* like this embodiment but also in a situation where five microphones or six microphones are provided at the outer peripheral portion of the display screen 31*a* as described above, arbitrary combinations can be adopted as combinations of the respective pairs of microphones.

Further, even in a situation where three microphones, five microphones, or six microphones are provided at the outer peripheral portion of the display screen 31*a*, an arbitrary arrangement conformation can be adopted as a specific arrangement conformation of the respective microphones at the outer peripheral portion.

Furthermore, when the functions as the position acquisition control unit and the correction unit in the present invention are added to the control unit 151, a coordinate position (x, y, z) indicative of an arbitrary indicated position P with respect to the display screen 31*a* may be acquired by the following processing different from this embodiment when indicator sound is detected.

Figure 23:
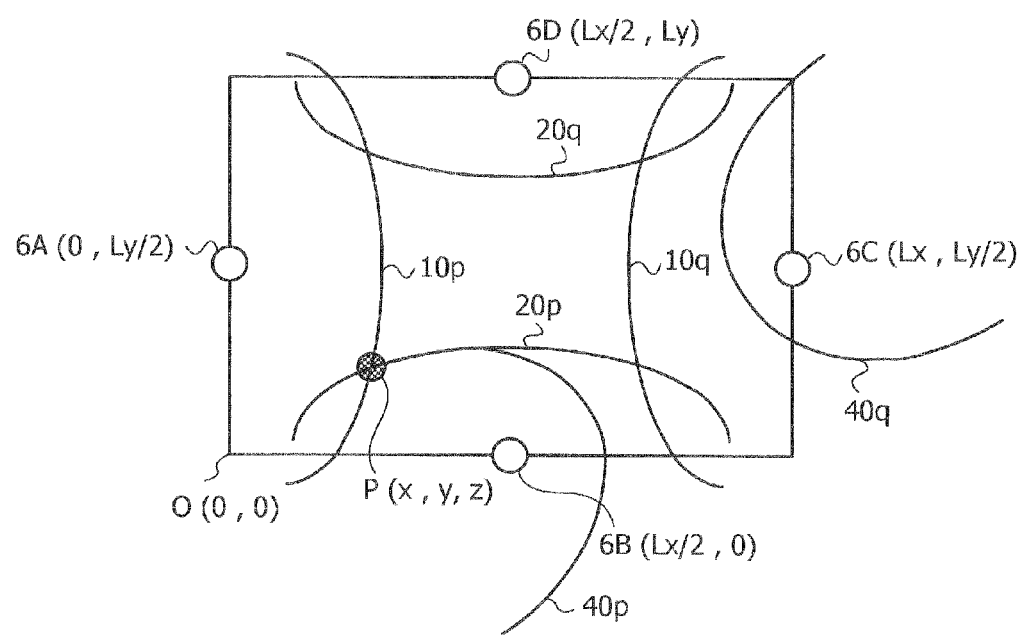
FIG. 23 is an explanatory view showing another combination of three pairs of microphones.

For example, the control unit 151 is allowed to execute processing of calculating a coordinate position (x, y, z) of an intersection P of three different hyperboloids shown in FIG. 13B and acquiring a calculation result as first indicated position information based on the procedure described in this embodiment. Then, the control unit 151 is allowed to change the third hyperboloid (a hyperbola) 30*p* or 30*q* having focal points at the first and fourth microphones 6A and 6D to a hyperboloid 40*p* or 40*q* having focal points at the second and third microphones 6B and 6C as depicted in FIG. 23 and then calculate a coordinate position (x, y, z) of the intersection P of the three different hyperboloids based on the same principle as that in this embodiment.

That is, the control unit 151 is operated to execute processing of acquiring an indicator sound arrival time difference in each of three pairs of microphones consisting of a combination (a second combination) different from the combination in this embodiment (a first combination), calculating the coordinate position (x, y, z) of the intersection P of the three hyperboloids based on the acquired arrival time difference in each pair, and acquiring a calculation result as second indicated position information. It is to be noted that FIG. 23 just shows the respective hyperboloids (hyperbolic curves) for the sake of simplicity like FIG. 13B, and shapes or positional relationships are different from actual ones.

Thereafter, the control unit 151 is operated to calculate an x coordinate of an intermediate point between an x coordinate in the first indicated position information and an x coordinate in the second indicated position information and acquire a calculation result as a corrected x coordinate. Likewise, the control unit 151 is allowed to calculate a y coordinate of an intermediate point between a y coordinate in the first indicated position information and a y coordinate in the second indicated position information and acquire a calculation result as a y coordinate. Moreover, the control unit 151 is operated to calculate a z coordinate of an intermediate point between a z coordinate in the first indicated position information and a z coordinate in the second indicated position information and acquire a calculation result as a corrected z coordinate.

In other words, the control unit 151 is operated to correct the first indicated position information by using the second indicated position information, acquire a coordinate position (x, y, z) based on the respective corrected x, y, and z coordinates as third indicated position information, and acquire the third indicated position information as final indicated position information.

As described above, when the combination of one pair in the three pairs of microphones is changed to acquire the first indicated position information and the second indicated position information and the acquired first indicated position information is corrected by using the second indicated position information to acquire the final indicated position information (the third indicated position information), a detection accuracy for the indicated position in the display screen 31a can be improved. It is to be noted that, as different from the above example, the combinations of all of the three pairs of microphones may be changed when acquiring the first indicated position information and the second indicated position information.

Further, in this embodiment, the description has been given as to the configuration where the control unit 151 sequentially assigns a coordinate value representing each point in the three-dimensional space in a fixed range above the display screen 31a to a coordinate value (x, y, z) in Equation (12) to obtain each calculation result (n) and acquires the coordinate value (x, v, z) when the calculation result (n) is minimum as indicated position information at the time of acquiring the indicated position information. However, an arbitrary method can be applied as a specific method when obtaining the indicated position information, i.e., a coordinate position (x, y, z) of an intersection (or a point that can be determined as an intersection) of three hyperboloids.

On the other hand, the indicator sound detected by the first to fourth microphones 6A to 6D may have characteristics in a frequency band in an audible range or may have characteristics in a frequency band in a non-audible range. When the indicator sound has characteristics in a frequency band in the audible range, a user who is operating the stylus pen 70 can be provided with a secure operational feeling. Furthermore, when the indicator sound has characteristics in a frequency band in the non-audible range, a user who feels that audibility of the indicator is troublesome can be provided with an excellent operating environment, and an inconvenience that people in a surrounding area feel the indicated sound as noise can be eliminated.

Moreover, the personal digital assistant 100 may have two types of detection modes, i.e., a first detection mode that the indicator sound to be detected has characteristics in a frequency band in the audible range and a second detection mode that the indicator sound to be detected has characteristics in a frequency band in the non-audible range as indicator sound detection modes, and a configuration that a user can switch the indicator sound detection modes as required may be assured. When the above-described configuration is assured for the personal digital assistant 100, a user can selectively use a stylus pen configured to generate indicator sound having characteristics in a frequency band in the audible range and a counterpart configured to generate indicator sound having characteristics in a frequency band in the non-audible range in accordance with his/her preference or a use environment.

Additionally, in this embodiment, the description has been given as to the configuration where the control unit 151 displays the soft key 501 constituted of the operation buttons in the display screen 31a of the LCM 31 when the soft key mode is set as an operation mode at the tire of use of the pen input function. However, in the soft key mode, the control unit 151 may be configured to display a single operation button in the display screen 31a as long as operating positions on multiple levels are virtually provided.

Further, in this embodiment, the configuration where alphabets or symbols are assigned to the operation buttons has been described as an example of the soft key 501. However, in the soft key 501, numbers may be divided into multiple groups to be assigned to each of the operation buttons, for example.

Furthermore, any information other than textual information may be displayed with respect to the soft key 501 or a single operation button that is displayed in the display screen 31a of the LCM 31 by the control unit as long as the information is previously assigned in accordance with an operating position on each level.

Moreover, in this embodiment, when the line drawing mode is set as an operation mode at the time of use of the pen input function, a line drawing displayed in the display screen 31a of the LCM 31 by the control unit 151 is the line K indicative of a locus of the end portion of the stylus pen 70 in a state where observation is carried out with a line of vision being parallel to the display screen 31a and coinciding with the vertical direction (the y axis direction) of the display screen 31a. However, the line drawing displayed in the display screen 31a of the LCM 31 by the control unit 51 in the line drawing mode may be provided in a state where a locus of the end portion of the stylus pen 70 is observed from an obliquely upper side of a movement range of the end portion, for example.

Additionally, the line drawing displayed in the display screen 31a of the LCM 31 by the control unit 151 does not have to be a single line drawing. That is, for example, three types of line drawings, i.e., a line drawing in a state where a locus of the end portion of the stylus pen 70 is observed from the x axis direction, a line drawing in a state where the same is observed from the y axis direction, and a line drawing in a state where the same is observed from the z axis direction may be simultaneously displayed in the display screen 31a of the LCM 31.

Additionally, in this embodiment, the description has been given as to the situation where the three types of operation modes, i.e., the soft key mode, the brush style mode, and the line drawing mode are prepared as the operation modes for using the pen input function in the personal digital assistant 100. However, in the personal digital assistant 100, other operation modes than the three types of operation modes may be provided.

As the other operation modes, there are, e.g., an operation mode in which the control unit 151 controls an image or the like different from the soft key 501 displayed in the display screen 31a in accordance with an indicated position (the indicated position information) with respect to the display screen 31 and an operation mode in which the control unit 151 newly displays in the display screen 31a arbitrary information (image information or textual information) different from a line drawing in accordance with an indicated position (the indicated position information) with respect to the display screen 31a.

Further, in the other operation modes, the control unit 151 may be allowed to execute processing of controlling an image or the like displayed in the display screen 31a or newly displaying arbitrary information in the display screen 31a during a period that the indicated position information is continuously acquired at fixed time intervals associated with an indicator sound emission cycle of the stylus pen 70, or it may be allowed to execute this processing at an arbitrary time point that the indicated position information is acquired.

Furthermore, in this embodiment, the description has been given as to the personal digital assistant 100 that has the configuration as the indicated position detecting apparatus according to the present invention and the configuration as the display apparatus according to the present invention and also has the pen input function that enables input of characters or line drawings using the stylus pen 70. However, the indicated position detecting apparatus and the display apparatus according to the present invention can be incorporated in not only the personal digital assistant 100 but also other apparatuses.

Moreover, the indicated position detected in the present invention, i.e., the coordinate position (x, y, z) indicative of an indicator sound emitted position in the three-dimensional space is not of course restricted to an indicated position with respect to the display screen of the LCM 31 described in this embodiment, and it may be an arbitrary indicated position in the display screen of any other display device such as a CRT than the LCM 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An indicated position detecting apparatus which detects an indicated position to a display screen, the apparatus comprising:
    a plurality of microphones arranged at an outer peripheral portion of the display screen to be apart from each other, and configured to constitute three sets of microphones and detect an indicator sound emitted from an arbitrary position above the display screen;
    a time difference acquisition unit configured to acquire each of arrival time differences of the indicator sound between the microphones in each of the three sets of microphones; and
    a positional information acquisition unit configured to acquire positional information indicating an emission position of the indicator sound in a three-dimensional space, as indicator position information indicating an indicated position to the display screen, based on the arrival time differences between the microphones in each of the sets acquired by the time difference acquisition unit;
    wherein:
        the positional information acquisition unit acquires positional information indicating a specific position corresponding to an intersection of a first hyperbola having the microphones in a first set as focal points, a second hyperbola having the microphones in a second set as focal points, and a third hyperbola having the microphones in a third set as focal points, respectively, specified by distance differences to the emission position of the indicator sound at the microphones in each of the sets represented by the arrival time differences, as the positional information indicating the emission position of the indicator sound in the three-dimensional space; and
        the positional information acquisition unit uses as a discriminant an equation in which a coordinate indicating a point in the three-dimensional space is used as an unknown number and a specific value is obtained by substituting a coordinate indicating the intersection of the first hyperbola, the second hyperbola, and the third hyperbola into the coordinate, and acquires a coordinate closest to the specific value as obtained by substituting a coordinate indicating each point in the three-dimensional space within a predetermined range above the display screen into the coordinate which is used as the unknown number in the discriminant, as the positional information indicating the emission position of the indicator sound in the three-dimensional space.

2. The apparatus according to claim 1, wherein the microphones in each of the sets are arranged at the outer peripheral portion of the display screen to sandwich the display screen.

3. The apparatus according to claim 1, wherein one or more of the plurality of microphones constitute microphones in two sets different from each other.

4. The apparatus according to claim 3, wherein the microphones in one of the three sets of microphones are constituted by one of the microphones in each of the other two sets.

5. The apparatus according to claim 4, wherein the plurality of microphones are arranged on a same plane parallel to the display screen.

6. The apparatus according to claim 4, wherein the microphones in one of the other two sets of microphones and the microphones in the other of the other two sets of microphones are arranged, in set, on one of two orthogonal straight lines and the other of the two orthogonal straight lines, respectively.

7. The apparatus according to claim 6, wherein the two straight lines are orthogonal to each other on an axis passing at a center of the display screen.

8. The apparatus according to claim 4, wherein:
    the display screen has a rectangular shape; and
    the microphones in one of the other two sets of microphones and the microphones in the other of the other two sets of microphones are arranged, in set, on a straight line including one of diagonal lines on the display screen and another straight line including the other of the diagonal lines, respectively.

9. The apparatus according to claim 1, further comprising:
    a position acquisition control unit configured to cause the time difference acquisition unit to acquire each of the arrival time differences of the indicator sound in each of the three sets of microphones by considering a combination of the microphones in each of the three sets of microphones as a first combination, cause the positional information acquisition unit to acquire the positional information indicating the emission position of the indicator sound in the three-dimensional space as first indicated position information indicating the indicated position to the display screen, based on the arrival time differences of the indicator sound in each of the three sets of microphones in the first combination acquired by the time difference acquisition unit, and acquire each of the arrival time differences of the indicator sound in each of the three sets of microphones in a second combination different from the first combination of the microphones in each of the three sets of microphones, and cause the positional information acquisition unit to acquire the positional information indicating the emission position of the indicator sound in the three-dimensional space as second indicated position information indicating the indicated position to the display screen, based on the arrival time differences of the indicator sound in each of the three sets of microphones in the second combination acquired by the time difference acquisition unit; and a correction unit configured to correct the first indicated position information acquired by the positional information acquisition unit by the second indicated position information acquired by the positional information acquisition unit, and acquire third indicated position information obtained by the correction as final indicated position information indicating the indicated position to the display screen.

10. A method of detecting an indicated position on a display screen, the method comprising:
acquiring each of arrival time differences of an indicator sound emitted from an arbitrary position above the display screen, between microphones in each of three sets of microphones constituted by a plurality of microphones arranged at an outer peripheral portion of the display screen to be apart from each other; and
acquiring positional information indicating an emission position of the indicator sound in a three-dimensional space, as indicator position information indicating an indicated position to the display screen, based on the acquired arrival time differences between the microphones in each of the sets;
wherein:
the acquiring the positional information comprises acquiring positional information indicating a specific position corresponding to an intersection of a first hyperbola having the microphones in a first set as focal points, a second hyperbola having the microphones in a second set as focal points, and a third hyperbola having the microphones in a third set as focal points, respectively, specified by distance differences to the emission position of the indicator sound at the microphones in each of the sets represented by the arrival time differences, as the positional information indicating the emission position of the indicator sound in the three-dimensional space; and
the acquiring the positional information uses as a discriminant an equation in which a coordinate indicating a point in the three-dimensional space is used as an unknown number and a specific value is obtained by substituting a coordinate indicating the intersection of the first hyperbola, the second hyperbola, and the third hyperbola into the coordinate, and acquires a coordinate closest to the specific value as obtained by substituting a coordinate indicating each point in the three-dimensional space within a predetermined range above the display screen into the coordinate which is used as the unknown number in the discriminant, as the positional information indicating the emission position of the indicator sound in the three-dimensional space.

11. A non-transitory computer readable storage medium having a program stored thereon which controls a computer to execute functions comprising:
acquiring each of arrival time differences of an indicator sound emitted from an arbitrary position above a display screen, between microphones in each of three sets of microphones constituted by a plurality of microphones arranged at an outer peripheral portion of the display screen to be apart from each other; and
acquiring positional information indicating an emission position of the indicator sound in a three-dimensional space, as indicator position information indicating an indicated position to the display screen, based on the acquired arrival time differences between the microphones in each of the sets;
wherein the acquiring the positional information comprises:
acquiring positional information indicating a specific position corresponding to an intersection of a first hyperbola having the microphones in a first set as focal points, a second hyperbola having the microphones in a second set as focal points, and a third hyperbola having the microphones in a third set as focal points, respectively, specified by distance differences to the emission position of the indicator sound at the microphones in each of the sets represented by the arrival time differences, as the positional information indiciating the emission position of the indicator sound in the three-dimensional space; and
using as a discriminant an equation in which a coordinate indicating a point in the three-dimensional space is used as an unknown number and a specific value is obtained by substituting a coordinate indicating the intersection of the first hyperbola, the second hyperbola, and the third hyperbola into the coordinate, and acquiring a coordinate closest to the specific value as obtained by substituting a coordinate indicating each point in the three-dimensional space within a predetermined range above the display screen into the coordinate which is used as the unknown number in the discriminant, as the positional information indicating the emission position of the indicator sound in the three-dimensional space.

12. A display apparatus comprising:
a display unit;
a plurality of microphones arranged at an outer peripheral portion of a display screen of the display unit to be apart from each other, and configured to constitute three sets of microphones and detect an indicator sound emitted from an arbitrary position above the display screen;
a time difference acquisition unit configured to acquire each of arrival time differences of the indicator sound between the microphones in each of the three sets of microphones;
a positional information acquisition unit configured to acquire positional information indicating an emission position of the indicator sound in a three-dimensional space, as indicator position information indicating an indication position to the display screen, based on the arrival time differences between the microphones in each of the sets acquired by the time difference acquisition unit; and
a display control unit configured to control a display content displayed on the display screen by the display unit, based on the indicator position information acquired by the positional information acquisition unit;
wherein:
the positional information acquisition unit acquires positional information indicating a specific position corresponding to an intersection of a first hyperbola having the microphones in a first set as focal points, a second hyperbola having the microphones in a second set as focal points, and a third hyperbola having the microphones in a third set as focal points, respectively, specified by distance differences to the emission position of the indicator sound at the microphones in each of the sets represented by the arrival time differences, as the positional information indicating the emission position of the indicator sound in the three-dimensional space; and
the positional information acquisition unit uses as a discriminant an equation in which a coordinate indicating a point in the three-dimensional space is used as an unknown number and a specific value is obtained by substituting a coordinate indicating the intersection of the first hyperbola, the second hyperbola, and the third hyperbola into the coordinate, and acquires a coordinate closest to the specific value as obtained by substituting a coordinate indicating each point in the three-dimensional space within a predetermined range above the display screen into the coordinate which is used as the unknown number in the discriminant, as the positional information indicating the emission position of the indicator sound in the three-dimensional space.

13. The display apparatus according to claim 12, wherein:
the plurality of microphones detect the indicator sound emitted from the arbitrary position above the display screen, at a constant time interval, at every emission;
the positional information acquisition unit acquires the indicator position information indicating the indicated position to the display screen every time the indicator sound is detected by the plurality of microphones; and
the display control unit controls the display content displayed on the display screen by the display unit based on the indicator position information while the indicator position information is sequentially acquired at the constant time interval by the positional information acquisition unit.

14. The display apparatus according to claim 12, wherein the display control unit controls the display content which is being displayed on the display screen by the display unit, based on the indicator position information.

15. A display control method comprising:
acquiring arrival time differences of an indicator sound emitted from an arbitrary position above a display screen of a display unit, between microphones in each of three sets of microphones constituted by a plurality of microphones arranged at an outer peripheral portion of the display screen to be apart from each other;
acquiring positional information indicating an emission position of the indicator sound in a three-dimensional space, as indicator position information indicating an indicated position to the display screen, based on the acquired arrival time differences between the microphones in each of the sets; and
controlling a display content displayed on the display screen by the display unit, based on the acquired indicator position information;
wherein:
the acquiring the positional information comprises acquiring positional information indicating a specific position corresponding to an intersection of a first hyperbola having the microphones in a first set as focal points, a second hyperbola having the microphones in a second set as focal points, and a third hyperbola having the microphones in a third set as focal points, respectively, specified by distance differences to the emission position of the indicator sound at the microphones in each of the sets represented by the arrival time differences, as the positional information indicating the emission position of the indicator sound in the three-dimensional space; and
the acquiring the positional information uses as a discriminant an equation in which a coordinate indicating a point in which a coordinate indicating a point in the three-dimensional space is used as an unknown number and a specific value is obtained by substituting a coordinate indicating the intersection of the first hyperbola, the second hyperbola, and the third hyperbola into the coordinate, and acquires a coordinate closest to the specific value as obtained by substituting a coordinate indicating each point in the three-dimensional space within a predetermined range above the display screen into the coordinate which is used as the unknown number in the discriminant, as the positional information indicating the emission position of the indicator sound in the three-dimensional space.

16. A non-transitory computer readable storage medium having a program stored thereon which controls a computer to execute functions comprising:
acquiring each of arrival time differences of an indicator sound emitted from an arbitrary position above a display screen of a display unit, between microphones in each of three sets of microphones constituted by a plurality of microphones arranged at an outer peripheral portion of the display screen to be apart from each other;
acquiring positional information indicating an emission position of the indicator sound in a three-dimensional space, as indicator position information indicating an indicated position to the display screen, based on the acquired arrival time differences between the microphones in each of the sets; and
controlling a display content displayed on the display screen by the display unit, based on the acquired indicator position information;
wherein the acquiring the positional information comprises:
acquiring positional information indicating a specific position corresponding to an intersection of a first hyperbola having the microphones in a first set as focal points, a second hyperbola having the microphones in a second set as focal points, and a third hyperbola having the microphones in a third set as focal points, respectively, specified by distance differences to the emission position of the indicator sound at the microphones in each of the sets represented by the arrival time differences, as the positional information indicating the emission position of the indicator sound in the three-dimensional space; and
using as a discriminant an equation in which a coordinate indicating a point in the three-dimensional space is used as an unknown number and a specific value is obtained by substituting a coordinate indicating the intersection of the first hyperbola, the second hyperbola, and the third hyperbola into the coordinate, and acquiring a coordinate closest to the specific value as obtained by substituting a coordinate indicating each point in the three-dimensional space within a predetermined range above the display screen into the coordinate which is used as the unknown number in the discriminant, as the positional information indicating the emission position of the indicator sound in the three-dimensional space.

17. A portable information terminal having an information inputting function, the terminal comprising:
a display unit;
a plurality of microphones arranged at an outer peripheral portion of a display screen of the display unit to be apart from each other, and configured to constitute three sets of microphones and detect an indicator sound emitted from an arbitrary position above the display screen;

a time difference acquisition unit configured to acquire arrival time differences of the indicator sound between the microphones in each of the three sets of microphones;

a positional information acquisition unit configured to acquire positional information indicating an emission position of the indicator sound in a three-dimensional space, as indicator position information indicating an indication position to the display screen, based on the arrival time differences between the microphones in each of the sets acquired by the time difference acquisition unit;

an input processing unit configured to execute information input processing based on the indicator position information acquired by the positional information acquisition unit; and a display control unit configured to control a display content displayed on the display screen by the display unit, based on the indicator position information acquired by the positional information acquisition unit, when the input processing unit executes the information input processing;

wherein:

the positional information acquisition unit acquires positional information indicating a specific position corresponding to an intersection of a first hyperbola having the microphones in a first set as focal points, a second hyperbola having the microphones in a second set as focal points, and a third hyperbola having the microphones in a third set as focal points, respectively, specified by distance differences to the emission position of the indicator sound at the microphones in each of the sets represented by the arrival time differences, as the positional information indicating the emission position of the indicator sound in the three-dimensional space; and the positional information acquisition unit uses as a discriminant an equation in which a coordinate indicating a point in the three-dimensional space is used as an unknown number and a specific value is obtained by substituting a coordinate indicating the intersection of the first hyperbola, the second hyperbola, and the third hyperbola into the coordinate, and acquires a coordinate closest to the specific value as obtained by substituting a coordinate indicating each point in the three-dimensional space within a predetermined range above the display screen into the coordinate which is used as the unknown number in the discriminant, as the positional information indicating the emission position of the indicator sound in the three-dimensional space.

18. The portable information terminal according to claim 17, wherein:

the plurality of microphones detect the indicator sound emitted from the arbitrary position above the display screen, at a constant time interval, at every emission;

the positional information acquisition unit acquires the indicator position information indicating the indicated position to the display screen every time the indicator sound is detected by the plurality of microphones;

the input processing unit executes the information input processing based on the indicator position information acquired by the positional information acquisition unit, while the indicator position information is sequentially acquired at the constant time interval by the positional information acquisition unit; and the display control unit controls the display content displayed on the display screen by the display unit based on the indicator position information acquired by the positional information acquisition unit while the indicator position information is sequentially acquired at the constant time interval by the positional information acquisition unit.

* * * * *